Nov. 29, 1960    J. J. LAREW ET AL    2,962,598
ELECTRIC POWER CONTROL SYSTEM
Filed May 28, 1956    7 Sheets-Sheet 1

Inventors:
John J. Larew
Wesley S. Burt
Billy R. Shepard
by, Richard E. Horley
Their Attorney Inventors:
John J. Larew
Wesley S. Burt
Billy R. Shepard
by, Richard E. Horley
Their Attorney Nov. 29, 1960 J. J. LAREW ET AL 2,962,598
ELECTRIC POWER CONTROL SYSTEM
Filed May 28, 1956 7 Sheets-Sheet 3

Inventors:
John J. Larew
Wesley S. Burt
Billy R. Shepard
by, *Richard E. Horley*
Their Attorney Nov. 29, 1960　　J. J. LAREW ET AL　　2,962,598
ELECTRIC POWER CONTROL SYSTEM
Filed May 28, 1956　　7 Sheets-Sheet 4

Inventors:
John J. Larew
Wesley S. Burt
Billy R. Shepard
by, *Richard E. Horley*
Their Attorney Nov. 29, 1960     J. J. LAREW ET AL     2,962,598
ELECTRIC POWER CONTROL SYSTEM
Filed May 28, 1956     7 Sheets-Sheet 5

Inventors:
John J. Larew
Wesley S. Burt
Billy R. Shepard
by, *Richard E. Horley*
Their Attorney Nov. 29, 1960 J. J. LAREW ET AL 2,962,598
ELECTRIC POWER CONTROL SYSTEM
Filed May 28, 1956 7 Sheets-Sheet 6

Inventors:
John J Larew
Wesley S. Burt
Billy R. Shepard
by, *Richard E. Horley*
Their Attorney Inventors:
John J. Larew
Wesley S. Burt
Billy R. Shepard
by, *Richard E. Horley*
Their Attorney United States Patent Office 2,962,598
Patented Nov. 29, 1960

2,962,598

ELECTRIC POWER CONTROL SYSTEM

John J. Larew, Waynesboro, Va., Wesley S. Burt, Hatboro, Pa., and Billy R. Shepard, Scotia, N.Y., assignors to General Electric Company, a corporation of New York Filed May 28, 1956, Ser. No. 587,561

33 Claims. (Cl. 290—4)

This invention relates to an electric power control system, and more particularly to apparatus for controlling most economically the output of a power system which comprises a plurality of interconnected generators and generating stations, which may be connected to other power systems by one or more tie lines, in response to changes in load and frequency. The present application is a continuation-in-part of copending application Serial No. 395,021 filed November 30, 1953 and now abandoned. The present invention, as well as the invention of said copending application, constitutes an improvement on the electric power control system which is the subject of copending application Serial No. 395,022, filed November 30, 1953, by Edward E. Lynch and John J. Larew, now Patent 2,824,240, issued February 18, 1958, and assigned to the same assignee as the present invention.

It is common practice for neighboring power systems to be interconnected by one or more tie lines over which an interchange of power is made according to preselected schedules. It is necessary, of course, that the tie line interchange be held at the previously scheduled values, and the frequency also held at its desired value.

Generally, each power system includes a plurality of generating stations, each of which contains a plurality of generators. It is known that if a plot is made of fuel input to drive a generator as a function of output power for the generator, the resulting plot, which is known as a fuel-input curve, is a curve and not a straight line and it varies from generator to generator. From this curve, another plot may be made of the slope of the fuel-input curve versus power output, which is known as an incremental fuel-rate curve. The incremental fuel rate may be converted to incremental cost by multiplying the incremental fuel rate by the fuel cost. It is known that, where all generator units are interconnected to supply the same system, and transmission losses are neglected, generally the minimum system fuel cost for a given load is obtained when all generator units are operated at the same incremental fuel cost.

In addition, the generators or generating stations having various incremental fuel costs are generally located at different distances from the load center and so there are various transmission losses which must be taken into account. For example, it must be determined whether or not it is cheaper to send low-cost power over a long distance than to send high-cost power over a short distance. The transmission losses which any given station must suffer in transmitting its generated power to a distribution point are generally accounted for in computations involving power distribution by a "penalty factor" assigned to the transmitting station. Therefore, a control system for controlling the power output of these generating stations should permit manual or automatic adjustment of the output to permit loading in accordance with incremental fuel cost and the penalty factor; that is, the output of each generator or station must be manually or automatically adjustable for maximum economy.

It is a primary object of the present invention to provide apparatus for automatically controlling the generation or output of a plurality of generators and generating stations that is capable of loading for maximum economy, holding tie line power interchange to previously arranged schedules automatically and, simultaneously, holding the system frequency at a predetermined value.

Another object of the invention is to provide a system wherein costly duplication of control equipment at each station is eliminated by controlling the system from a central control station that requires only one control signal communication channel from the central control station to each controlled generating station.

Another object is to provide a load-frequency control system wherein an identical signal representing change in incremental cost of generated power may be sent to all generating stations, where it is converted to signals representing desired power output from the individual generators for this incremental cost, and the power output of the generators is varied in accordance with the latter signals so that the incremental cost of generated power is the same for all generators.

Another object is to provide a control system wherein a change in power output is made quickly in response to a change in area requirement, and the output of the various generators is then reapportioned at a slower rate in accordance with economic loading considerations.

Another object of the invention is to provide a power control system which is capable of effectively controlling the generation of a local power area when the local area is not interconnected with a remote area or, if a local and remote area are interconnected, is capable of holding the power interchange at a prescheduled value without regard for system frequency or the system frequency at its predetermined value without regard for power interchange.

Another object is to provide a tie line load-frequency control system which does not require readjustment when a generator or station ceases operation or starts operation to continue operation of the controlled units at equal incremental costs.

A further object of the invention is to provide a system which is as simple and inexpensive in first cost and maintenance as is consistent with performance of the required functions.

The basic operation of a tie line load-frequency control system can be shown by considering two areas, A and B, interconnected by a tie line and both having their own generation and loads. Economic and other considerations would dictate the most desirable load to send over the tie line, and this could be redetermined as often as required. Generally, the power interchange is rescheduled daily to provide loading for maximum economy and is readjusted at various times during the date of this schedule. In addition to holding the tie line load to the prescheduled value, it is essential that the frequency of the generation in both areas be held at the desired value, which in present day operations is usually 60 cycles per second.

It is known that tie line load and frequency can both be held to the desired values by proper manipulation of the generator output at A and B, in spite of load changes at either A or B. For example, assume that the condition exists wherein the loads at A and B and the scheduled tie line load are exactly supplied. Then, if a reduction in load occurs in area A, it results in an excess of generation at A over that required, which tends to increase both the frequency of generation and the tie line power flow from A to B. Similarly, an increase in load at A results in decreased frequency and decreased tie line power flow from A to B. However, when the load at B decreases, the frequency increases, but the tie line load from A to B decreases. Similarly, when the load at B increases, the frequency decreases, and the tie line load from A to B increases. Therefore, it is apparent that an increase in both frequency and the tie line power flow from A to B, or a decrease in both frequency and tie line power flow from A to B, indicates a load change in area A. Similarly, when the frequency and tie line power flow or load change in opposite directions, it indicates a load change in area B. Therefore, by knowing both the change in frequency and change in tie line load, it can be determined whether the load has changed in area A or area B, and the proper adjustments can be made in the generation for these two areas. These facts indicate that for the tie line load-frequency control, either automatic or manual, at least two primary detectors are required; one which detects frequency and one which detects load.

It is apparent that to restore the system to predetermined or scheduled conditions after the load changes in both areas, corrective action is required at both areas A and B; and if area A properly increases or decreases its generation exactly to supply increases or decreases in load at A, area B will be required to take care of only if its own load changes by corresponding generation changes at B. The system of the present invention is limited to corrective action in only one such area; that is, a control system is required in area A to take care of changes in load and frequency in area A, and another system is required in area B to take care of changes in load and frequency in area B. Thus, a control initiating signal which is a function of frequency divergence and tie line load divergence is required in order to accomplish this desired control automatically, with the system comprising the present invention.

A load-frequency power control system constructed in accordance with the invention comprises essentially two parts, detector means and control signal producing means located at a central control station and control signal responsive means located at each of the generating stations comprising the controlled power network. The detector means function to produce a signal $\Delta f$ proportional to the deviation of the actual system frequency from a standard frequency and to produce a signal $\Delta w$ proportional to the deviation of the actual tie line load from its scheduled value. The control signal producing means combines the $\Delta f$ and $\Delta w$ signals into a control signal which may be considered as representing either area power requirement or a change in incremental cost of generated power. The control signal is then transmitted by conventional means to the individual generating stations.

Each generating station embodies control signal responsive means which utilize the control signal to vary the power outputs of the various generators within the station. The signal responsive means includes means for selecting all or a fractional part of the control signal transmitted thereto to be supplied to individual controls for each generator, and means for each generator for converting the control signal to a signal representing desired power output for that particular generator. The generation of each generator is then varied in accordance with the corresponding desired power output signal.

The control signal responsive means at each generating station comprises two channels, both of which receive the control signal from the central control station. One channel acts to change the power output of the generating station relatively quickly in accordance with the area requirement represented by the control signal, and other channel acts more slowly to reapportion the outputs of the various generators comprising the station in accordance with incremental fuel cost differences between the generators.

The frequency deviation signal $\Delta f$ and the load deviation signal $\Delta w$ are combined in the detector means in such a manner that if the deviations are due to a change in load in area B, $\Delta f$ and $\Delta w$ tend to cancel each other and no change is made in the control signal to the stations of area A. If the change in load which causes the change in tie line power interchange and the change in system frequency has occurred in area A, which is taken to be the area which is controlled by the system of the invention, a corrective signal will be applied to the governors which is continuously present and proportional to the deviation from schedule.

For a better understanding of the invention, together with further objects and advantages thereof, reference is made to the following description taken in conjunction with the accompanying drawings, in which:

Figs. 4 and 4a are schematic diagrams of a servo amplifier that may be embodied in the apparatus shown in Fig. 1;

The power control system of this invention may be used to control the generation of a local power area, which is interconnected with one or more remote power areas by tie lines, in response to changes in the tie line load and frequency. Also, the control system may be made responsive to tie line load changes only or to system frequency changes only. However, for purposes of explanation, the more involved system, which is responsive to both tie line load and system frequency changes, is illustrated and will be described hereafter.

The terms "frequency" and "phase" are used interchangeably throughout this specification, as are the terms "frequency difference" and "phase difference" and the interchangeable terms are taken to have the same meanings.

Figure 3:
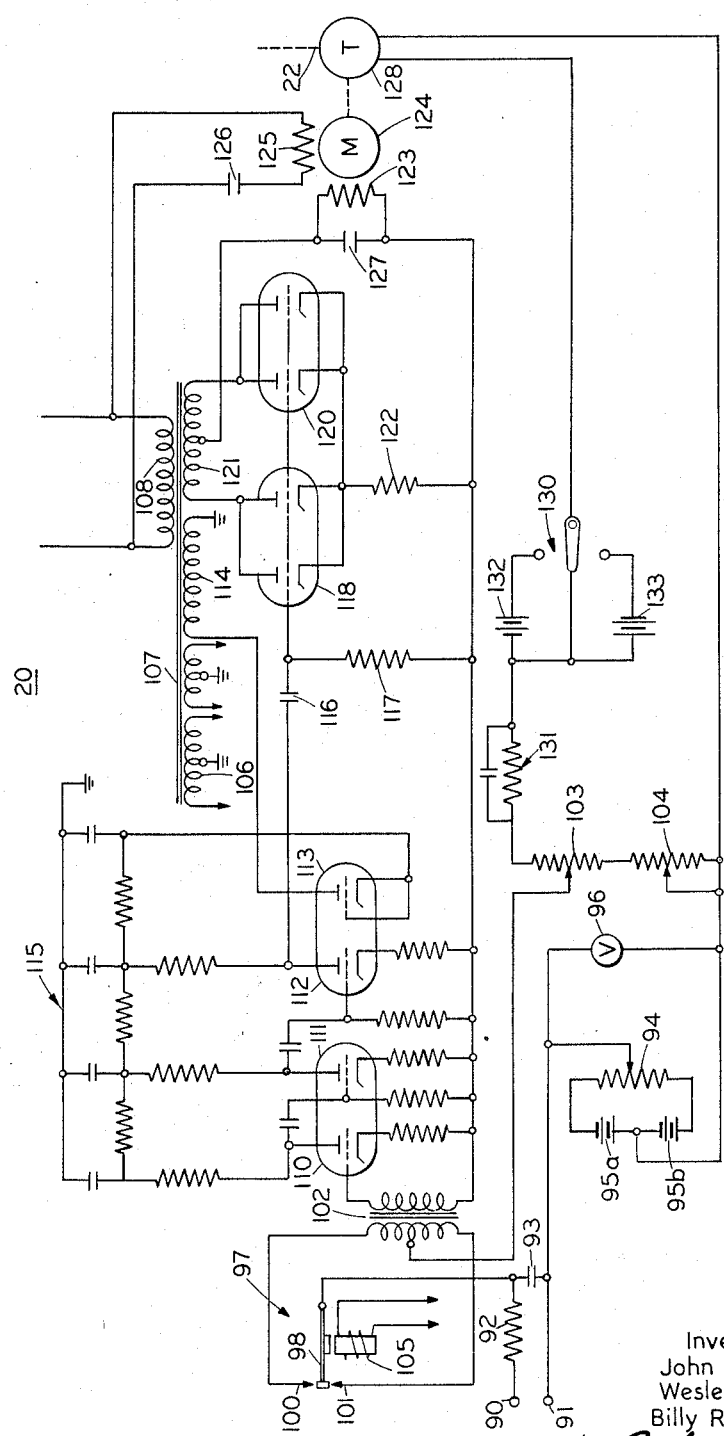
Fig. 3 is a schematic diagram of a tie line load controller shown in block form in Fig. 1.

The tie line load-frequency control system of the invention embodies two primary detectors, one for detecting deviation of the system frequency from a desired value, and one for detecting the tie line load deviation from its prescheduled value, both forming part of the central control station equipment. Referring now to the embodiment of that equipment shown in Fig. 1, the means for detecting the deviation of the tie line load from the pre-scheduled value comprises a tie line load controller 20 and a differential selsyn 21. One input to the tie line load controller 20 is from a conventional telemeter receiver or the like (not shown), such as is available commercially, which provides to the load controller a signal $w_a$ proportional to the actual tie line load. The tie line load controller 20 is essentially a servo-mechanism, and any one of numerous known devices may be so employed. One servomechanism, which is known to be suitable for this use, is shown and described in U.S. Patent 2,753,505 issued July 3, 1956, on copending application Serial No. 395,117, filed November 30, 1953, by J. J. Larew and K. N. Burnett, and assigned to the same assignee as the present invention. A schematic diagram of that device is shown in Fig. 3 and will be described hereafter. However, the present invention is not limited to the use of any one particular device for this purpose. Briefly, the tie line load controller 20 compares the signal $w_a$ received from the telemeter receiver with another signal $w_s$, which is produced within the tie line load controller and whose value may be made proportional to the pre-scheduled value of tie line load, and produces rotation of an output shaft 22 at a speed proportional to the amplitude difference $\Delta w$ between the two signals and in a direction determined by the polarity of the difference.

The output shaft 22 is connected to the rotor of the differential selsyn 21, whose three-phase stator winding is energized from the system power line, having a frequency $f_a$. As is well known, when the rotor of a differential selsyn is rotated, the frequency of the voltage induced in its three-phase winding is equal to the frequency of the voltage which energizes the stator winding plus or minus the speed of rotation of the rotor. For example, if the stator winding of a differential selsyn is energized by a 60-cycle per second voltage and the rotor is turned at 5 revolutions per second, the frequency of the voltage induced in the three-phase rotor windings will be either 55 cycles per second or 65 cycles per second, depending on the direction of rotation of the rotor. In the present instance, the shaft 22 which drives the rotor of the differential selsyn 21 is rotated at a speed $k\Delta w$ which is proportional to the tie line load deviation from the scheduled value, where $\Delta w$ is the deviation and $k$ is a proportioning constant. Therefore, the frequency of the induced voltage on the rotor of selsyn 21 is $(f_a+k\Delta w)$, where $k\Delta w$ may be either positive or negative, depending on the direction of rotation of shaft 22 and the selsyn rotor.

Figure 4:
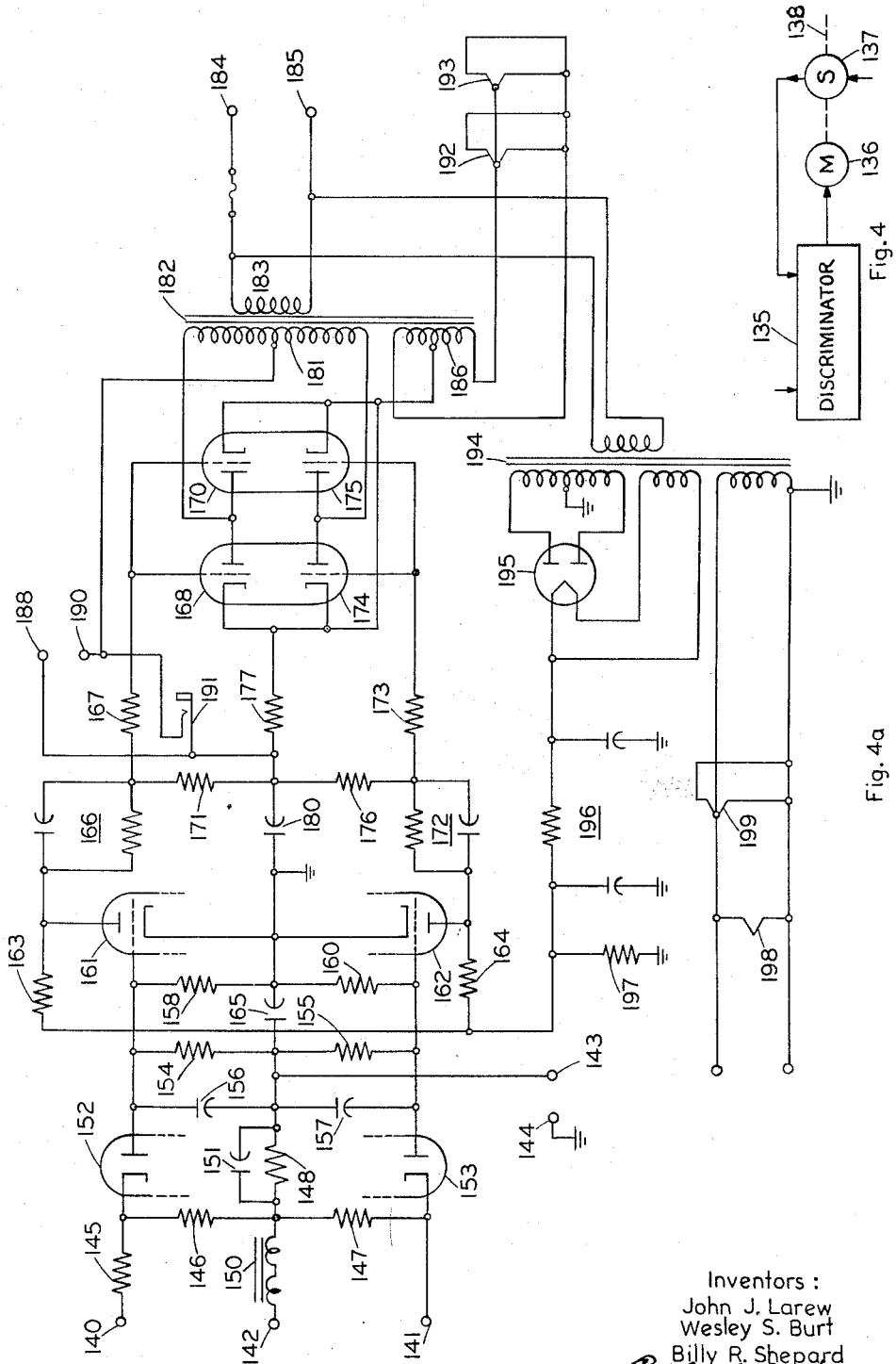

The voltage induced on the three-phase rotor of differential selsyn 21, having a frequency $(f_a+k\Delta w)$, is supplied to one input of a servo amplifier 23, which, with a frequency standard 24, comprises the means for detecting the system frequency deviation from the standard or desired frequency. The output of the frequency standard 24 is supplied to a second input of the servo amplifier 23. The frequency standard 24 may be of any conventional well-known type, such as an oscillator whose frequency is controlled by a tuning fork or a crystal, and its principal requirements are that it provide an output signal of sufficient amplitude to drive the servo amplifier 23 and of a frequency $f_s$ which is constant to the degree required by public utility power generation systems. The servo amplifier 23 may be one of several known designs. One servo amplifier, which is known to be suitable for this use, is described in copending application Serial No. 395,119 filed November 30, 1953 by J. J. Larew and C. E. James, now Patent No. 2,856,523, issued October 14, 1958, and assigned to the same assignee as the present invention. The schematic diagram of that amplifier is shown in Figs. 4 and 4a and will be described hereafter. However, the present invention is not limited to the use of any particular device and any servo amplifier that functions in the described manner may be employed. Briefly, the servo amplifier 23 compares the frequencies or phases of the two input signals and produces rotation of an output shaft 25 at a speed proportional to the frequency or phase difference between the two signals and in a direction determined by the polarity of the difference.

As was previously mentioned, the signal supplied to the servo amplifier 23 from the differential selsyn 21 has a frequency $(f_a+k\Delta w)$, and the signal supplied thereto from the frequency standard 24 has a frequency $f_s$. The frequency $f_a$ may be defined as $f_a=f_s+\Delta f$, where $\Delta f$ may be positive or negative. Therefore, when the two input signals are compared in the servo amplifier and the shaft 25 caused to rotate at a speed proportional to the frequency difference, the shaft rotates at a speed proportional to $(\Delta f+k\Delta w)$. Thus if the tie line load controller 20 is adjusted to rotate output shaft 22 and the rotor of differential selsyn 21 in a direction to add to the stator energizing frequency $f_a$ when the actual tie line load is greater than the scheduled load and to subtract from $f_a$ when the actual load is less than scheduled, $\Delta f$ and $k\Delta w$ will be arithmetically added together when the tie line load and system frequency both vary in the same direction from their respective standards. As was previously mentioned, system frequency and actual tie line load both increase or both decrease with the load changes in the local area, whose generation is being controlled by the system, when the line power is considered as flowing from area A to area B.

On the other hand, when the load changes in the remote area, the system frequency and tie line load vary in opposite directions, and $\Delta f$ and $k\Delta w$ tend to cancel each other and cause no change in generation in the local area. Since this effect is desired, the constant $k$, by which $\Delta w$ is multiplied, is adjusted by varying the gain of the tie line load controller 20 so that $\Delta f$ and $k\Delta w$ just cancel each other, when the changes in system frequency and tie line load are due entirely to a load change in the remote area. The proper value of $k$ may be found easily by experimentation. Of course, a constant $k$ may be applied to the frequency deviation signal $\Delta f$ rather than to the load deviation signal $\Delta w$, so long as its value is such as to cause the two deviation signals to cancel each other when they are caused by load changes in the remote area.

It is again pointed out that various means may be employed to cause rotation of a shaft, such as the shaft 25, proportional to the algebraic sum of the two deviation signals, and the control system of the invention is not limited to any particular methods or apparatus for producing the deviation signals.

The shaft 25 is connected to the rotor of a differential selsyn 26, and the three-phase stator winding of the selsyn is energized from the system power line having frequency $f_a$. Therefore, the frequency of the voltage induced on the three-phase rotor winding of differential selsyn 26 is $f_a+(\Delta f+k\Delta w)$, which is the fundamental control signal to be sent to the generating stations. It is apparent that deviation of the control signal frequency from the system frequency is proportional to the area power requirement and the integral of that frequency difference is a function of system incremental cost of generated power or of system load.

In order to provide a visual indication of system conditions to an operator at the central control station, the shaft 25 is also connected through suitable gearing to the movable contact pick-off arm of a potentiometer 27. The potentiometer 27 is connected across a source of unidirectional potential 28 and a voltmeter 30 connected to the pick-off arm of the potentiometer provides an indication of the position of the movable pick-off arm.

The potentiometer 27 serves to integrate the output of the servo amplifier 23 (the area requirement or change in incremental cost signal) and the position of the potentiometer pick-off contact indicates system load or incremental cost. Thus, the scale of voltmeter 30 may be calibrated in terms of either of those quantities; it will be assumed for purposes of the following description that the voltmeter 30 indicates incremental cost of generated power. Of course, the incremental cost indication may be obtained through means other than a direct current energized potentiometer.

The rotor windings of differential selsyn 26 on which the control signal appears, are connected to the stator windings of a control transformer selsyn 31 whose rotor is connected to a reversible motor 32. The selsyn 31 and the motor 32 form part of a penalty factor unit 33, one such unit being provided at the central control station for each controlled generating station. The motor 32 may be caused to rotate by manually closing a switch (not shown) to connect the motor to a suitable power source. When motor 32 is energized and the rotor of control transformer selsyn 31 rotated, the frequency of the system control signal induced in the rotor windings is increased or decreased from the frequency of the signal which energizes the stator winding of the selsyn. In this case, the effect of rotating the rotor of the selsyn is to add to or subtract from the system control signal frequency, which might be done in order to reapportion the load between the various stations of the network.

As is well known to those skilled in the power transmission art, definite losses occur in transmitting power from a generating station to a load. In order for optimum economic system operation to occur, it is necessary to evaluate those transmission losses so that generation may be properly allocated among the various stations comprising the network. For example, it is obviously uneconomical to transmit equal amounts of power to a load from generating stations located at unequal distances from the load, assuming that both stations can produce power at the same cost. Therefore, it is necessary to reduce the power output of the distant station and increase the output of the closer station, so that the costs of power delivered to the load from the two stations are equal.

The calculation of transmission losses and penalty factors assigned to the various stations to correct for those losses is well known to those skilled in the art, and is described in an article entitled "Evaluation of Methods of Coordinating Incremental Fuel Costs and Incremental Transmission Losses," by L. K. Kirchmayer and G. W. Stagg, AIEE Transactions, vol. 71, 1952, and in an article entitled "Transmission Losses and Economic Loading of Power Systems," by L. K. Kirchmayer and G. H. McDaniel, published in General Electric Review, October, 1951.

The penalty factor for a generating station may be inserted by energizing the motor 32 as previously described, to turn the rotor of selsyn 31 a specific number of turns. This increases or decreases the generation of the station relative to that indicated by the system control signal, which is supplied to the stator of selsyn 31. In order to provide a visual indication of the penalty factor of the station at all times, the motor of selsyn 31 may be mechanically connected through suitable gearing to a pointer 34 operating in conjunction with a scale 35. The scale 35 may be calibrated in terms of penalty factor.

In general, the various stations of the power system will be at various points from the load center and, hence, will have different penalty factors. Therefore, it is generally necessary to provide a penalty factor unit 33 for each controlled station in the system. It is understood that although in the diagram of Fig. 1 only two penalty factor units are shown, the number of units in a system would correspond to the number of controlled generating stations which, of course, is not limited to any particular number.

The system control signal is supplied from the rotor of control transformer selsyn 31 in the penalty factor unit 33 to a frequency divider 36. The frequency divider 36 reduces the control signal frequency to make it more suitable for transmission. The control signal, whose frequency is now reduced, may then be transmitted by a carrier current transmitter 37 to the individual station affected. It is to be understood that the control signal may be sent to the individual stations by any conventional means such as leased wire, microwave transmissions, etc. For example, transmission means that are suitable for the present use are described in U.S. Patent 2,701,329 issued February 1, 1955 to E. E. Lynch and G. S. Lunge, and assigned to the same assignee as the present invention.

It is noted at this point that the entire system requires only one primary detector to detect frequency deviation and one primary detector to detect tie line load deviation, both being located at the central control station. However, the central station will contain a penalty factor unit 33 and control signal transmission means for each controlled station in the network.

Figure 1:
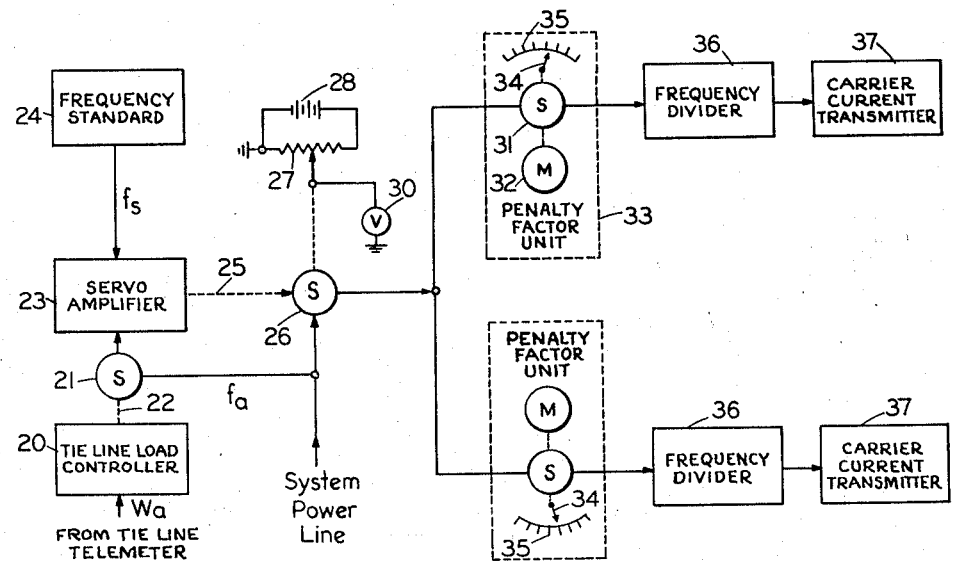
Fig. 1 is a schematic block diagram of one embodiment of detector means and control signal producing means located at a central control station.
Figure 2:
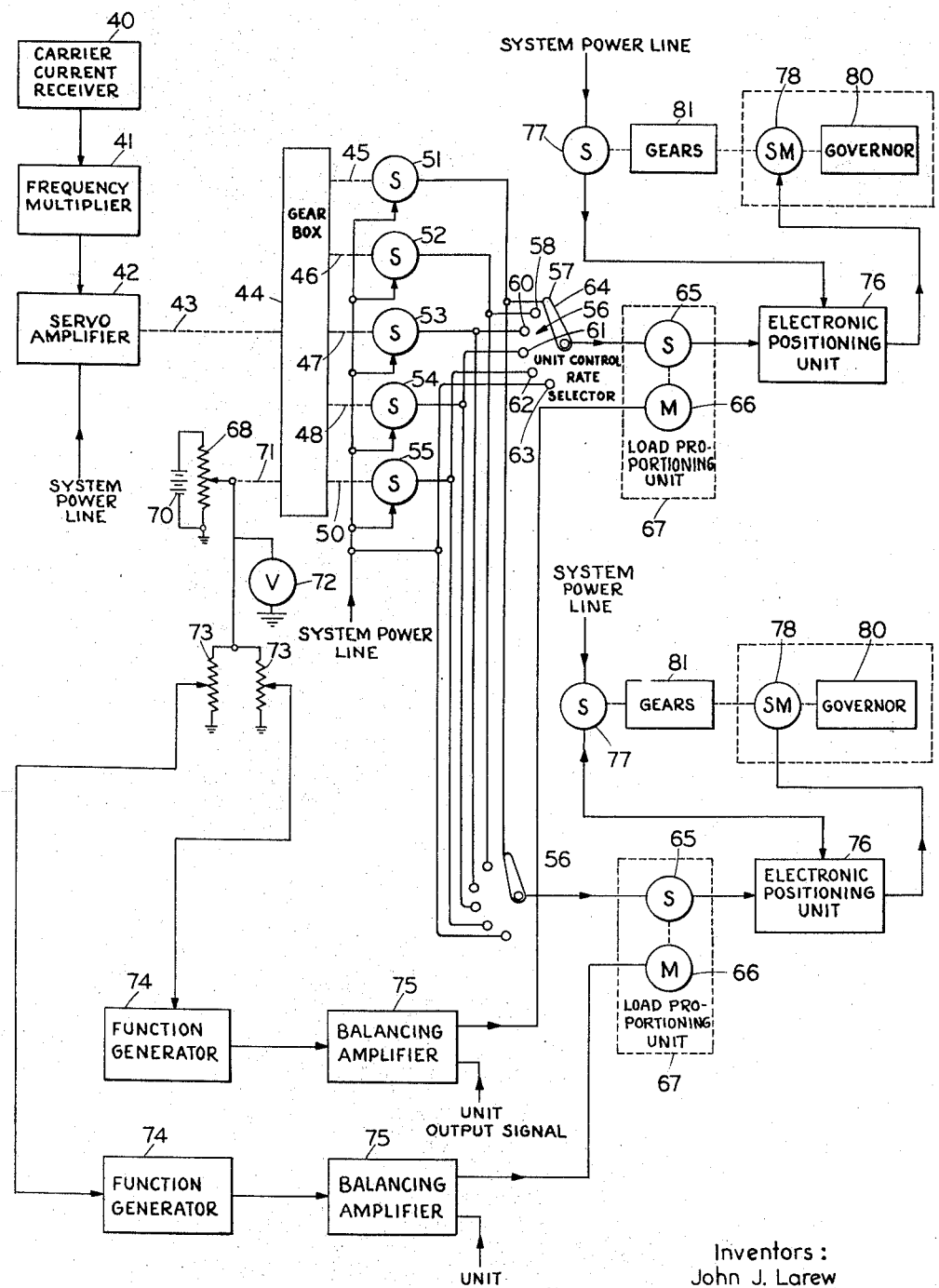
Fig. 2 is a schematic block diagram of the control signal responsive means located at each generating station.

Referring now to the control signal responsive means located at each generating station, as shown in Fig. 2, the control signal sent to each station is received by suitable means such as a carrier current receiver 40, and its original frequency is restored by a frequency multiplier 41. Thus, the output of frequency multiplier 41 is once again a control signal having a frequency $f_a + (\Delta f + k \Delta w)$. Of course, the control signal may have been modified by the penalty factor unit 33 (Fig. 1), but it is assumed for clarity of explanation that it has not been modified. It is noted that Fig. 2 illustrates only one station, and the control elements for only two generators within that station are shown. It is understood, however, that the equipment shown will be duplicated in each controlled generating station of the network, and that each station may comprise any number of individual generators, each with the specific pieces of control equipment which serve them.

The control signal from frequency multiplier 41 is supplied to one input of a servo amplifier 42, which is similar to the servo amplifier 23 previously described, and may be identical, if desired. The second input to the servo amplifier 42 is from the system power line having a frequency $f_a$. Because of the similarity of the servo amplifiers 23 and 42, it is sufficient here to note that the servo amplifier 42, compares the frequency of the control signal $f_a + (\Delta f + k \Delta w)$ with the system frequency $f_a$, and produces rotation of an output shaft 43 at a speed proportional to the frequency or phase difference between the two signals and in a direction determined by the polarity of the difference.

The shaft 43 is connected to the input of a gear box 44, which has output shafts 45, 46, 47, 48, and 50. The gear box 44 is of conventional design and it may be arranged to have the gear ratios between its input shaft and its output shafts of any desired values. In the present instance, it has been found satisfactory to have ratios between the input shaft and output shafts 45, 46, 47, 48, and 50 of 1:1, 4:3, 2:1, 4:1, and 10:1, respectively, so that output shaft 45 rotates at the same speed as the input shaft and the other output shafts rotate at fractions of this speed. The output shafts 45, 46, 47, 48, and 50 are connected to the rotors of differential selsyns 51, 52, 53, 54, and 55, respectively; and the three-phase stator windings of these selsyns are energized from the system power line having frequency $f_a$. Therefore, the frequency of the voltage induced on the three-phase rotor winding of differential selsyn 51 will be $f_a + (\Delta f + k \Delta w)$, the frequency of the voltage induced on the rotor of selsyn 52 will be $f_a$ plus 75% of the area requirement signal $(\Delta f + k \Delta w)$, the rotor of selsyn 53 will have an induced voltage of frequency $f_a$ plus 50% of the area requirement signal, the induced voltage on the rotor of selsyn 54 will be of frequency $f_a$ plus 25% of the area requirement signal, and the frequency of the induced voltage on the rotor of selsyn 55 will be $f_a$ plus 10% of the area requirement signal.

The induced voltages on the rotors of the differential selsyns are each coupled to a contact of a station control rate selector switch 56, the rotors of selsyns 51, 52, 53, 54, and 55 being connected to contacts 57, 58, 60, 61, and 62, respectively, and the system power line having frequency $f_a$ is connected to contact 63. It is pointed out that the rotors of the differential selsyns which are connected to selector switch 56 have three-phase windings thereon; and therefore, selector switch 56 would normally have three banks of contacts but is shown as a single-bank switch only for purposes of explanation. A station control rate selector switch 56 is provided for each of the generators comprising the controlled station, so that the control rate may be individually selected for each generator in accordance with its response capabilities. This is necessary because generating equipments of various ages and physical conditions have different rates at which they are capable of varying their output. In the drawing, only two such control rate selector switches are shown connected in parallel; but it is understood that any number may be employed which corresponds with the number of generators under control within the station.

A movable contact selector arm 64 of each unit control rate selector switch 56 is connected to the stator winding of a control transformer selsyn 65, which is thus energized by one of the three-phase voltage outputs of the differential selsyns 51—55. The control transformer selsyn 65 and a motor 66, to which the selsyn rotor is connected, constitute a load proportioning unit 67, which is somewhat similar in function to the penalty factor unit 33 previously described with reference to Fig. 1. Each load proportioning unit 67, one of which is required for each generator controlled, serves to allow the control signal supplied from the control rate selector switch 56 to be modified in accordance with the economic considerations for each of the generator units.

At the generating station, a voltage proportional to the incremental cost of generated power at the station is provided from a potentiometer 68 connected across a standard voltage source 70. The potentiometer 68 is similar in function to potentiometer 27 in the central control station, and has a movable contact pick-off arm which is connected to an output shaft 71 of the gear box 44.

The potentiometer 68 serves to integrate the output of the servo amplifier 42, and the voltage present on the potentiometer pick-off arm represents the incremental cost of power generated by that station. If no penalty factor has been applied to the control signal for that station (or if the penalty factor is unity), of course the voltage present on the pick-off arm of potentiometer 68 is the same as that present on the pick-off arm of potentiometer 27 in the central control station. A voltmeter 72 connected to indicate the voltage on the arm of potentiometer 68 may be calibrated in terms of station incremental cost.

The incremental cost voltage appearing on the movable contact arm of potentiometer 68 is supplied to parallel-connected potentiometers 73, one of which may be required for each generator within the station. Each potentiometer 73 serves to multiply the incremental cost voltage by a fuel cost factor, and produce on its movable contact pick-off arm a voltage which is proportional to the incremental heat rate for the corresponding generator. If the fuel cost is the same for all of the generators within the station, only one potentiometer need be used, and all of the outputs taken from the contact pick-off arm of the single potentiometer. However, it is possible that the fuel cost will vary from generator to generator, and the settings of the potentiometer pick-off arms will vary slightly from one to another to take this difference into account.

The incremental heat rate signal from the pick-off arm of each potentiometer 68 is supplied to the input of a function generator 74. Although the present invention is not limited to the use of any particular function generator, one which is known to be suitable will be described later with reference to the diagrams shown in Figs. 5–7.

Each function generator 74 serves to produce an output signal that is proportional to the power output of the generator at which occurs the incremental heat rate corresponding to the input signal. The output signal of each function generator 74 is supplied to an input of a balancing amplifier 75 which will be described hereafter. A second input of each balancing amplifier 75 receives a signal from a telemeter receiver or other conventional means, which is proportional to the output of the controlled generator. Each balancing amplifier then compares the amplitudes of the two input signals; and if there is a difference in their amplitudes, energizes the motor 66 in the load proportioning unit 67 to modify the control signal output of the control transformer selsyn 65 to cause the output of each generator to be varied until the signal proportional to that output is the same as the output signal of the corresponding function generator 74. Thus, each generator tends to adjust its output to the point of most economic loading.

If the generators are being run by turbines, it may be desirable to adjust the function generators 74 to produce an output signal that is proportional to the valve position of the turbine, rather than the power output of the generator. In this case, the signal connected to the second input of the balancing amplifier will be proportional to the valve position of the turbine, rather than to the actual power output of the generator.

Figure 9:
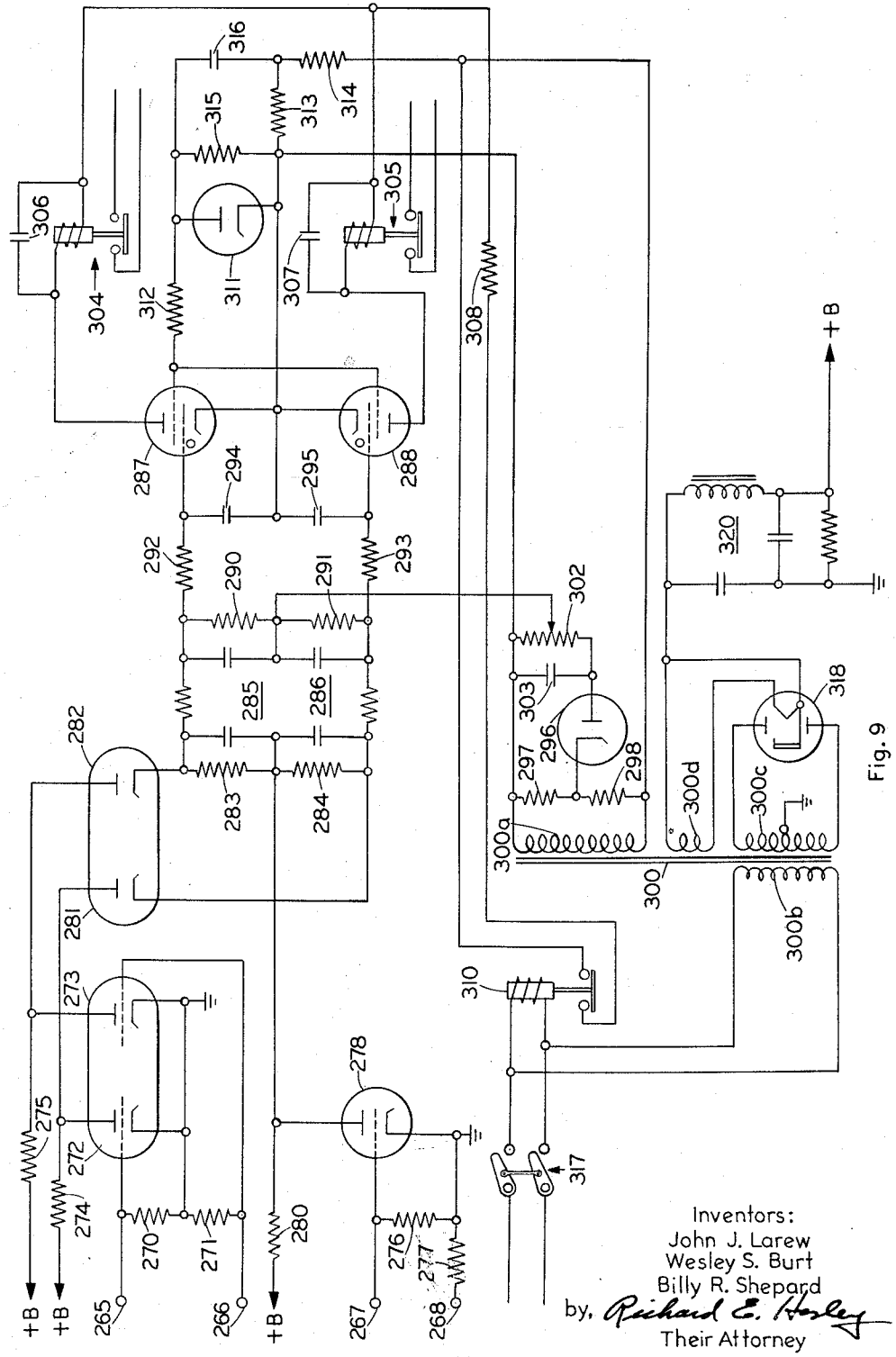
Fig. 9 is a schematic diagram of an electronic position-unit shown in block form in Fig. 2.

The control signal output of the rotor of each control transformer selsyn 65 is supplied to one input of an electronic positioning unit 76. The electronic positioning unit 76 serves to compare the phases (or frequencies) of two input signals and, if they do not agree, to provide an output which will actuate other apparatus to correct the difference. The present invention is not limited to the use of any particular electronic positioning unit, but one such device which is known to be suitable is described in copending application Serial No. 395,118 filed November 30, 1953 by J. J. Larew, now Patent No. 2,796,556, issued June 18, 1957, and assigned to the same assignee as the present application; the schematic diagram of that device is shown in Fig. 9 of the present application and will be described hereafter.

As previously mentioned, one of the inputs to the electronic positioning unit 76 is from the rotor of control transformer selsyn 65, which signal has a frequency equal to $f_a+(\Delta f+k\Delta w)$, if it is assumed for ease of explanation that the control signal has not been modified by the penalty factor unit or the load proportioning unit. The second input to the electronic positioning unit is from the rotor of a control transformer selsyn 77, whose three-phase stator winding is energized by the system line power having frequency $f_a$. From the previous description of the operaiton of a control transformer selsyn, it is apparent that the frequency of the voltage induced in the single-phase rotor winding of selsyn 77 will be the same as that which energizes the three-phase stator winding, unless the rotor is rotated to add to or subtract from that frequency. The electronic positioning unit 76 serves to compare the frequency of the signal connected thereto from the rotor of control transformer selsyn 65 in the load proportioning unit 67 with the frequency of the signal connected thereto from the rotor of control transformer selsyn 77. If the frequencies of the two signals differ, the electronic positioning unit 76 energizes a reversible synchronizing motor 78, which changes the speed-level setting of a governor 80 of the generator prime mover (not shown). The synchronizing motor 78 is reversible, and the operation of the electronic positioning unit 76 is such that it can cause the synchronizing motor to turn in either direction, depending on the direction of frequency difference between the two input signals to the unit. The synchronizing motor 78, which is connected to the governor 80, is also connected through a reduction gear assembly 81 to the rotor of control transformer selsyn 77. Thus, as the synchronizing motor 78 rotates in response to an output from the electronic positioning unit 76, it also rotates the rotor of control transformer selsyn 77, and thus changes the frequency of the signal induced on the rotor. Therefore, the rotor of selsyn 77 will be so rotated that the frequencies of the signals supplied to the two inputs of the electronic positioning unit 76 agree. Thus, the speed-level setting of the governor 80 is changed by an amount proportional to the integral with respect to time of the area requirement signal $(\Delta f+k\Delta w)$.

Consider now the operation of the tie line load-frequency control system shown in Figs. 1 and 2 in response to load changes in the local area, which is controlled by the system, and in the remote area to which the local area is joined by one or more tie lines. For purposes of explanation, it will be assumed that the change in load occurs at either the local area or the remote area, and the complex situation in which load changes occur simultaneously in both areas will not be considered. It is pointed out, however, that in the more complicated situation, the operation of the control system is basically the same as in the simple situation involving only one load change; and if the control system is installed in both the local and remote areas, the system will be quickly restored to normal, even in the case where the loads at the local and remote areas change simultaneously in varying proportions.

First, consider the case in which the load in the local area decreases, thus resulting in an excess of generation in this area. It is apparent that, in this case, the system frequency will increase and the power transmitted over the tie line from the local area to the remote area will also increase. Thus, the signal $w_a$ from the telemeter receiver proportional to actual tie line load supplied to the tie line load controller 20 will be larger than the signal $w_s$, which is produced within the tie line load controller and is proportional to the prescheduled value of tie line load. The output shaft 22 of the tie line load controller will rotate at a speed $k\Delta w$ proportional to the tie line load deviation $\Delta w = w_s - w_a$. Therefore, because the actual tie line load is greater than the prescheduled value, output shaft 22 will rotate in a direction so that the signal supplied to the input of the servo amplifier 23 from the rotor of differential selsyn 21 will be equal to $(f_a + k\Delta w)$ where $\Delta w$ is negative.

The actual system frequency $f_a$ is greater than the standard frequency $f_s$; and, therefore, when the standard frequency $f_s$ is compared with the system frequency $f_a$ by the servo amplifier 23, the shaft 25 will rotate at a speed proportional to $-(\Delta f + k\Delta w)$, the two deviation signals adding together to produce the area requirement signal which is also proportional to change in incremental cost of generated power.

The area requirement signal having frequency $$-(\Delta f + k\Delta w)$$

is then combined with a signal having the system frequency $f_a$ by the selsyn 26. In this particular case, the shaft 25 turns the rotor of selsyn 26 in a direction to subtract the area requirement frequency from the system frequency in order to reduce the power generated within the controlled area. The frequency of the signal supplied from the rotor windings of selsyn 26 to the stator windings of the control transformer selsyns 31 in the penalty factor units 33 is equal to $f_a - (\Delta f + k\Delta w)$.

As the shaft 25 rotates, it also positions the movable contact pick-off arm of potentiometer 27 to provide a voltage thereon which represents the incremental cost of generated power for the system load. This incremental cost is indicated to the operator by the voltmeter 30.

Assuming that the penalty factor for the station is not changed and the motor 32 in the penalty factor unit is not energized, the control signal passes through the penalty factor unit with its frequency unchanged and is then transmitted to each generating station through the frequency divider 36 and transmitter 37 or other conventional means.

At each individual generating station (Fig. 2), the control signal is returned to its proper frequency by the frequency multiplier 41 and is fed into the servo amplifier 42, which serves to subtract the system frequency $f_a$ from the signal and cause the shaft 43 to rotate at a speed proportional to the area requirement signal $-(\Delta f + k\Delta w)$. Various proportions of this signal are again combined with the system frequency signal $f_a$ by the differential selsyns 51—55. The unit control rate selector switches 56 permit the selection of any one of variously proportioned control signals (or only the system frequency from contacts 63) to be sent to the control signal responsive means for the individual generators within the station.

For purposes of illustration, it is assumed that the 100% control signal is selected from the unit control rate selector switches 56 and supplied to the stator windings of control transformer selsyns 65 in the load proportioning units 67. As the shaft 43 rotates, it positions the movable contact pick-off arm of the potentiometer 68 from which is derived a voltage proportional to the incremental cost of delivered power for the station. This incremental cost voltage is modified by the fuel cost factor of the various units by potentiometers 73, and the resultant incremental heat rate voltage is fed to the function generators 74. The function generators 74 serve to produce an output voltage which is proportional to the output of each generator corresponding to the incremental heat rate voltage sent to the function generators, and the balancing amplifiers 75 serve to compare the actual outputs of each generator unit with the desired outputs as derived from the function generators. If these two factors are not the same, the balancing amplifiers 75 produce voltages to cause rotation of the motors 66 in the load proportioning units to add to or subtract from the frequency of the station control signal to attain the desired output from the individual generators. A generator control signal is supplied from the rotor of each control transformer selsyn 65 to one of the inputs of each electronic positioning unit 76. This signal, which has a frequency $f_a - (\Delta f + k\Delta w)$, assuming that no economic factor modification has occurred, is compared in phase or frequency with the system frequency $f_a$; and, because there is a difference in phase or frequency between the signals, synchronizing motor 78 is energized to re-set downwardly the speed-level setting of governor 80. Simultaneously, the rotor of control transformer selsyn 77 is rotated to send back to the electronic positioning unit a signal whose frequency is the same as that provided the other input of the electronic positioning unit from control transformer selsyn 65. Thus, the motor 78 rotates until the control signal frequency $f_a -\Delta f + k\Delta w)$ equals the system frequency $f_a$, and the speed-level setting of governor 80 remains at its new level.

It is again pointed out that this same action occurs for each of the controlled generators within each station; and, because each generator unit is provided with a unit control rate selector switch 56 and with an economic control portion comprising a function generator 74 and a balancing amplifier 75, the speed-level settings of the governors for the various generators may differ one from the other. Similarly, because in the central control station there is a penalty factor unit 33 for each controlled station of the network, the control signals received by the stations may differ from each other.

As a further example of the operation of the system, consider the case in which the load in the local area increases, thus causing a decrease in the frequency of the system and a decrease in tie line load from the local area to the remote area. In this case, the operation of the various components of the system would be like that previously described for the case where the load in the local area decreased, except that the direction of rotation of the various motors and selsyns would be opposite to that previously described. For example, the frequency deviation $\Delta f$ and the tie line load deviation $\Delta w$ would both be positive. Thus, the rotation of the shaft 25 in the system master controller would be in an opposite direction from that previously described; and the frequency of the control signal derived from the selsyn 26 in the master controller would be greater than the frequency $f_a$ of the system. At each individual controlled station the electronic positioning units 76 would cause the synchronizing motors 78 of the generators to turn in a direction so as to increase the speed-level settings and increase the generation, rather than decreasing it as was the case in the first example considered.

A different situation arises when the load in the remote area changes. For example, if the load in the remote area decreases, the system frequency $f_a$ tends to increase and the power flow over the tie line from the local area to the remote area decreases. Therefore, the frequency $f_a$ is greater than the standard frequency $f_s$; and the frequency deviation $\Delta f$ is negative. However, the actual tie line load $w_a$ decreases, thus becoming less than the scheduled load $w_s$, and the load deviation $\Delta w$ is positive. When the servo amplifier effectively takes the difference between the frequencies of its two input signals, $k\Delta w$ and $\Delta f$ tend to cancel each other; and the shaft 25 will not rotate. Therefore, the signal sent from the control station to each individual generating station will be a signal having frequency $f_a$, in the absence of a change of penalty factor. At the individual stations, this frequency is compared with the system frequency $f_a$; and, because these two frequencies are the same, there will be no control action exercised in the individual stations. Therefore, the outputs of the generators in the local area will be unchanged by such a load change in the remote area.

As a final example, consider the situation when the load in the remote area increases, thus tending to decrease the system frequency, and increase the power flow from the local to the remote area. In this case, the frequency deviation $\Delta f$ is positive, and the tie line load deviation $k\Delta w$ is negative. Thus, it is apparent that once again the shaft 25 will not rotate, and the control signal received by each of the stations will once again have the system frequency $f_a$, which will initiate no change in the speed-level setting of the governors of the generators.

The consideration of the last two examples brings out another of the outstanding advantages of the invention. It was noted that although the control signal was such as to cause no change in the speed level settings of the governor generators, nevertheless the control signal was present. Thus, the control signal may be continuously monitored to insure that it is present, even though the corrective portion of the control signal may be zero.

If the control system is to be used to control the generation of a local power system, which is operating independently and is not connected by a tie line to a remote power system, the tie line load controller 20 and the differential selsyn 21 may be dispensed with or made inoperative and the system power line having frequency $f_a$ connected directly to the second input of the servo amplifier 23. In that case, any load changes in the independent local area will cause a change in system frequency, which will cause the power system to vary its generation to return the system frequency to its standard value, and thus cause the generation output to match the system load.

In some interconnected power systems, it is customary for one system to vary its generation to maintain only the tie line load at its prescheduled value and to ignore system frequency changes. In that case, the servo amplifier 23, frequency standard 24 and differential selsyn 21 may be eliminated or made inoperative, and the output shaft 22 of the tie line load controller 20 connected directly to the rotor of the selsyn 26 and the potentiometer 27. The frequency of the control signal will be dependent only on the tie line load deviation, and the generation of the local system adjusted only to maintain the tie line load at its prescheduled value without regard for system frequency.

Another advantage of the present invention is that various units within a station, or even stations themselves, may be taken out of or added to the control system, without affecting its operation. If, for example, a station is taken out of operation for some reason, its share of the output will be automatically reapportioned among the remaining stations. Thus, the control system will continue to operate and will continuously adjust the output of the stations and generators to account for load changes within the local area, in order to retain the tie line load at its prescheduled value and the frequency of the system at its desired point.

Also, it is apparent that control of the individual generator units is independent of the characteristics of the synchronizing motors. This is so because there is feedback from each synchronizing motor 78 through the control transformer 77 to its electronic positioning unit 76, so that each motor is individually controlled.

It is pointed out that the economic factor control equipment, which is one of the most important features of the present invention, permits continuous, automatic adjustment of the outputs of each generating station and generators to maintain the most economic operation possible.

It will be recalled that the tie line load deviation signal $\Delta w$ is provided by the tie line load controller 20 in the central control station (Fig. 1). The tie line load controller 20 receives a direct current signal $w_a$ proportional to actual tie line load, compares it to a signal $w_s$ provided within itself and proportional to desired or scheduled tie line load, and causes rotation of the output shaft 22 at a speed proportional to the difference $\Delta w$. The present invention is not limited to the use of any particular device for the tie line load controller. However, apparatus that operates satisfactorily in this application is described in copending application Serial No. 395,117 filed November 30, 1953 by J. J. Larew and K. N. Burnett, now Patent No. 2,753,505, issued July 3, 1956 and assigned to the assignee of the present invention. Reference is made to that application for a detailed description of the device, which will now be described in more general terms with reference to its schematic circuit diagram shown in Fig. 3.

The direct current input signals $w_a$ proportional to tie line load, which is to be compared with a reference signal $w_s$ proportional to desired or scheduled tie line load, may be connected between a pair of input terminals 90 and 91. A smoothing filter comprising a resistor 92 and a capacitor 93 serves to shunt any alternating current ripple voltage that might be superimposed on the direct current signal. The reference direct current signal $w_s$ is derived from a potentiometer 94 connected across a pair of standard direct voltage cells 95a, 95b. The movable contact arm of the potentiometer 94 is connected in series circuit relationship with the capacitor 93. A voltmeter 96 is connected between the movable arm of potentiometer 94 and the juncture of the cells 95a, 95b; the voltmeter may be calibrated directly in terms of desired tie line loaf $w_s$, and the load schedule varied by changing the position of the potentiometer movable arm.

The series circuit formed by capacitor 93 and potentiometer 94 is coupled to a means for converting direct current to alternating current. Such means comprises a solenoid-operated chopping device 97 having a movable armature 98 and a pair of fixed contacts 100 and 101 connected to opposite ends of the center tapped primary winding of a transformer 102. The center tap of the transformer primary winding is connected to the movable arm of a potentiometer 103, one end of which is connected between the cells 95a, 95b through a potentiometer 104 adapted to function as a variable resistance. The function of potentiometers 103, 104 will be explained hereafter.

The operation of a device such as the chopper 97 is well known in the art, and will not be described in detail. Briefly, however, the chopper is actuated by an operating winding 105 that is energized from a low voltage secondary winding 106 of a main power transformer 107, whose primary winding 108 may be connected to the 60-cycle power line of the system. As the operating winding 105 of chopper 97 is energized by the 60-cycle alternating current flowing therethrough, the armature 98 is caused to vibrate between contacts 100 and 101 at the frequency of the current through operating winding 105. Thus, during one-half of each cycle of the energizing alternating current supplied to the operating winding, current flows through one-half of the primary winding of transformer 102; and, during the other half cycle of the energizing current, current flows through the other half of the primary winding. The direction of this current flow depends on whether the direct current signal ($w_s - w_a$) supplied by the series circuit comprised by capacitor 93 and potentiometer 94 is positive or negative; that is, the current flow through the primary winding of transformer 102 may be from the ends of the winding to the center tap if the deviation signal $\Delta w$ is of one polarity, and from the center tap to the ends of the winding if the signal is of the other polarity. An alternating current signal is induced in the secondary winding of transformer 102 which is in phase with the voltage appearing across operating winding 105 if the direct current signal $\Delta w$ supplied to armature 98 is of one polarity, and which is 180° out of phase with the voltage across operating winding 105 if the direct current signal $\Delta w$ is of the opposite polarity. Because the phase of the voltage across operating winding 105 (which is derived from secondary winding 106 of transformer 107) is taken to be in phase with the 60-cycle line voltage, the 60-cycle line voltage which energizes the primary winding 108 of transformer 107 may be used as an alternating current reference voltage. Hence, by comparing the phase of the alternating current signal induced across the secondary winding of transformer 102 with the phase of the 60-cycle line voltage supplied through primary winding 108 of transformer 107, an indication may be obtained of the polarity of the direct current signal $\Delta w$ supplied by capacitor 93 and potentiometer 94.

The alternating current signal induced in the secondary winding of transformer 102 is coupled to the control grid of the first stage of a conventional three-stage resistance-capacitance coupled amplifier, comprising triode electron discharge devices 110, 111, and 112, along with the necessary anode and cathode resistors and the interstage resistor-capacitor coupling circuits. Voltage is supplied to the anode of the discharge devices 110, 111, and 112 by a half-wave rectifier 113. Rectifier 113 is energized from a secondary winding 114 on main power transformer 107; and the direct current output thereof is supplied through a conventional resistance-capacitance filter network 115 to the respective anode electrodes of electron discharge devices 110, 111, and 112.

The amplified alternating current signal appearing on the anode of triode electron discharge device 112, which is of opposite phase from that appearing across the secondary winding of transformer 102, is supplied by means of a coupling capacitor 116 and grid biasing resistor 117 to the control grids of a pair of duo-triode electron discharge devices 118 and 120. The anodes of duo-triode 118 are connected together and to one end of a secondary winding 121 of power transformer 107, and the anodes of duo-triode 120 are connected together and to the other end of secondary winding 121. The four cathodes of the duo-triode tubes 118 and 120 are interconnected and have a common cathode resistor 122. From the foregoing description, it is apparent that the anodes of duo-triode 118 are energized by a potential that is 180° out of phase with the potential that energizes the anodes of duo-triode 120. A center tap on seconary winding 121 of transformer 107 is connected to a field winding 123 of a two-phase motor 124, whose other winding 125 is connected through a capacitor 126 to the 60-cycle line voltage input, previously mentioned as being the phase reference alternating current voltage for the device. The capacitor 126 in series with winding 125 serves to insure that the current through that winding is 90° out of phase with the current through winding 123 for reasons which will be pointed out later. A capacitor 127 connected across winding 123 serves as a filter and to tune the output circuit of the final stage.

As was previously mentioned, an alternating current signal is provided on the input of the three-stage amplifier which is in phase, or 180° out of phase, with the 60-cycle line voltage input. Therefore, the alternating current signal supplied to control grids of duo-triodes 118 and 120 is also in phase, or 180° out of phase, with the 60-cycle line voltage which energizes primary winding 108 of transformer 107. Hence, the alternating current signal is either in phase with the anode voltage of duo-triode 118 and 180° out of phase with the anode voltage of duo-triode 120, or vice versa. If there is an alternating current signal on the grids of the duo-triodes 118 and 120, one of the duo-triodes will conduct more heavily than the other; and there will be more current through motor winding 123 during one half-cycle than during the other half-cycle to cause the motor 124 to rotate in one direction or the other. Of course, the direction in which the motor turns is determined by the polarity of the direct current deviation signal $\Delta w$, and its speed of rotation is related to the amplitude of the deviation signal. It is pointed out that at balance, when there is no deviation signal $\Delta w$, equal currents flow through motor winding 123 during both halves of each cycle, and the motor 124 does not rotate.

The motor 124 is connected to a feedback signal developing means comprising a direct current tachometer 128 which when rotated in one direction produces a direct current feedback voltage of a certain polarity, and when rotated in the opposite direction produces a direct current feedback voltage of the opposite polarity, the amplitude of the voltage being proportional to the speed of rotation. The direct current voltage produced by tachometer 128 as motor 124 rotates is fed back to the deviation signal producing circuit, previously described, to linearize the output speed of motor 124 with respect to the direct current deviation signal input. One side of the output circuit of tachometer 128 is connected to the juncture of cells 95a, 95b, and the other side is connected to the movable contact of a three position selector switch 130. One of the fixed contacts of the three position selector switch is connected directly through a resistor-capacitor network 131 to the previously unconnected end of potentiometer 103, whose other end is connected to potentiometer 104, the two potentiometers functioning as a voltage divider. The remaining two fixed contacts of selector switch 130 are connected to the network 131 through a pair of batteries 132 and 133, arranged with opposite polarities. By proper selection of the fixed contacts of selector switch 130, a positive or negative voltage may be added in series with the direct current feedback voltage developed by tachometer 128. Because the movable contact of potentiometer 103 is connected to the center of the primary winding of transformer 102, the feedback signal is added to the direct current deviation signal developed by capacitor 93 and potentiometer 94.

It is apparent that as various amounts of the direct current feedback signal from tachometer 128 are fed back to the deviation signal developing circuit comprising potentiometer 94 and capacitor 93, the slope of the curve of the output motor speed versus input volts will vary, and will be stabilized thereby. It is also apparent that if the direct current feedback voltage is too small, this output curve will cease to be linear. It is the function of the voltage divider comprising potentiometers 103 and 104 to set the amount of direct current feedback voltage available. Thus, the setting of the movable contact of potentiometer 104 is determined by the amount of D.C.

feedback voltage required to linearize the output curve of motor speed versus deviation signal $\Delta w$, and is influenced by the slope desired for this curve. The desired slope for the curve of output speed versus input deviation signal may be obtained by adjustment of the movable contact arm of potentiometer 103.

For purposes of explanation and description, let it be assumed that during the first half of each cycle of the 60-cycle reference voltage, current flows through the upper half (as seen in the drawing) of the primary winding of transformer 102, and during the second half of each cycle, current flows through the lower half of the winding. Let it also be assumed that the direct current tie line load signal $w_a$ connected between input terminals 90 and 91 is more positive than the reference signal $w_s$ taken from potentiometer 94 and, therefore, that current will flow downwardly through the upper half of the primary winding of transformer 102 during the first half of each cycle, and upwardly through the lower half of the winding during the second half of each cycle. Thus, it is assumed that the alternating current signal appearing across the secondary winding of transformer 102 is in phase with the 60-cycle voltage supplied across the primary winding 108 of power transformer 107. Therefore, because the amplifier comprising discharge devices 110, 111, and 112 has an odd number of stages, the signal appearing on the anode of discharge device 112 is 180° out of phase with the reference 60-cycle supply voltage. Now, let it also be assumed that the voltage on the anodes of duo-triode 118 is in phase with the 60-cycle power line reference voltage, and thus voltage on the anodes of duo-triode 120 is 180° out of phase with this reference voltage. Therefore, if during the first half of each cycle the alternating current signal appearing on the control grids of the duo-triodes is negative, while the voltage appearing on the anodes of duo-triodes 118 is positive and the voltage on the anodes of duo-triode 120 is negative, no current will flow through either of the duo-triodes if the alternating current signal is great enough. However, during the second half of each cycle, the alternating current signal placed on the control grids is positive, the anodes of duo-triode 118 are negative, but anodes of duo-triode 120 are positive. Therefore, current will flow through duo-triode 120 during the second half of each cycle. Thus, depending on the connections, the phase of the current flowing through motor winding 123 is either 90° ahead or 90° behind the phase of the current flowing through motor winding 125, and the motor will turn in a certain direction. As the motor 124 turns, tachometer 128 generates a direct current feedback voltage, part of which appears across potentiometers 103 and 104. That feedback voltage is of proper polarity to act as a negative feedback, in the manner well known in electronic circuitry. Thus, the direct current deviation signal tends to be reduced as the motor speed is increased and the net effect is to cause the speed of the motor 124 to stabilize at a speed $k\Delta w$ which is proportional to the direct current tie line load deviation signal $\Delta w$.

Conversely, if the direct current tie line load signal $w_a$ connected across terminals 90 and 91 is negative with respect to the reference voltage set on potentiometer 94, during the first half of each cycle current flows upwardly through the upper half of the primary winding of transformer 102, and flows downwardly during the lower half of the winding during the second half of each cycle. Thus, the signal appearing across the secondary winding of the transformer is 180° out of phase with 60-cycle line voltage which energizes primary winding 108 of the power transformer 107. Again, the alternating current signal appearing on the anode of discharge device 112 is 180° out of phase with the input, and thus is in phase with the 60-cycle reference voltage. During the first half of each cycle, as was previously pointed out, the anodes of duo-triode 118 are positive, and the anodes of duo-triode 120 are negative. Thus, during the first half of each cycle, in the present illustration where the direct current deviation signal is negative rather than positive, the control grids of duo-triode 118 are positive at the same time that the anodes thereof are positive. Therefore, current flows through duo-triode 118 during the first half of each cycle. During the second half of each cycle, the signal appearing on control grids is negative; and, therefore, if the signal is of sufficient magnitude, neither of the duo-triodes in the final stage conduct. Thus, it is seen from the two examples just described, that when the direct current deviation signal $\Delta w$ is positive, current flows through motor winding 123 during the second half of each cycle, and when the direct current deviation signal is negative current flows through the motor winding during the first half of each cycle. Because of the capacitor 126 in series with motor winding 125, the current flowing through motor winding 123 is either displaced in phase 90° ahead or 90° lagging the current through winding 125; and the motor turns in opposite directions when the direct current deviation signal is positive or negative. A suitable direct current feedback signal will then be developed and fed back to the input of the mechanism in the manner described above.

It is noted that the mechanical connection between the motor 124 and the tachometer 128 may be extended to provide the connection 22 between the tie line load controller 20 and the selsyn 21, as shown in Fig. 1.

Figs. 4 and 4a illustrate a possible form of the servo amplifiers 23 and 42 previously mentioned with reference to Figs. 1 and 2, although the present invention is not limited to the use of this particular device. The servo amplifier illustrated forms the subject matter of copending application Serial No. 395,119 as previously noted.

It will be recalled that the servo amplifiers 23 and 42 serve to compare the frequencies or phases of two electrical signals and produce rotation of an output shaft at a speed proportional to the frequency difference.

Referring to Fig. 4, it is seen that the servo amplifier comprises a discriminator 135, which will be later described in detail; a convention two-phase motor 136; and a conventional control transformer selsyn 137. One input to the discriminator 135 may be from a frequency standard (as in Fig. 1) or other source (not shown), and the second input is from the rotor of the selsyn 137. The stator winding of the selsyn 137 is energized by the signal whose frequency or phase is to be compared to that of the signal from the frequency standard or other source, which is connected to the first input of the discriminator. If there is a difference in frequency or phase between the input signals to the servo amplifier, there is an output from the discriminator 135 that causes the motor 136 to rotate. The rotor of the selsyn 137 is connected to the output shaft of the motor and rotates with it, as does a shaft 138 that is the output shaft of the servo amplifier.

As is well known, the voltage induced in the rotor winding of a control transformer selsyn has the same frequency as the voltage which energizes the stator winding of the transformer, if the rotor is not rotating. However, if the rotor is turning, the voltage induced across the rotor winding will differ from the stator voltage by an amount determined by the speed of rotation of the rotor. For example, if the stator is energized by a voltage having a frequency of 60 cycles per second, and the rotor is rotated at five revolutions per second, the voltage induced in the rotor winding will have a frequency of either 55 or 65 cycles per second, depending on the direction of rotation of the rotor. Thus, in the present instance, as the motor 136 turns in response to a phase or frequency difference between the servo amplifier input signals, it will vary the frequency or phase of the second input signal to the discriminator, which is taken from the rotor of the control transformer selsyn 137. It is apparent that, when the elements are connected as a servo amplifier in the manner shown in Fig. 4, the motor 136 will be caused to rotate the rotor of selsyn 137 and the output shaft 138 at a speed which is proportional to the phase or frequency difference between the first input signal to the discriminator 135 and the signal which energizes the stator winding of the selsyn 137.

Fig. 4a illustrates a possible form of the discriminator 135 that is embodied in the servo amplifier shown in Fig. 4. Referring now to Fig. 4a, one of the two input signals, which must be approximately a sine wave and must not be grounded, may be connected to input terminals 140 and 141, and the second input signal connected to terminals 142 and 143 if the signal is not grounded, or to input terminals 142 and 144 if the signal is grounded. The input signal connected to terminals 140 and 141, which is taken to be the reference signal and will be hereafter referred to as signal "A," produces a voltage drop across resistors 145, 146, and 147, connected in series between the input terminals resistors 146 and 147 are of the same value, so that the signals appearing across them are equal, and resistor 145 serves merely as a series dropping resistor.

The second input signal is assumed, for purposes of explanation, to be ungrounded and connected to terminals 142 and 143. This signal, which will be hereinafter referred to as signal "B," appears across a resistor 148 connected between terminal 143 and the junction of resistors 146 and 147. An inductance 150 is connected between input terminals 142 and the junction of resistors 146 and 147, and operates as a filter in conjunction with a capacitor 151 connected across resistor 148, which permits the application of an alternating voltage to terminals 142 and 143 that may be of other than a strict sine wave shape.

The junction of resistors 145 and 146 is connected to the cathode of an electron discharge device 152 of the diode type, and input terminal 141 is connected to the cathode of a similar discharge device 153. It is now seen that at any instant, the signal appearing at the cathode of diode 152 is the vector sum of the signals appearing across resistors 146 and 148, and the signal appearing at the cathode of diode 153 is the vector sum of the signals appearing across resistors 147 and 148.

The anodes of diodes 152 and 153 are connected together through resistors 154 and 155, the juncture of which is connected to input terminal 143. Resistors 154 and 155 are of equal value so that, when diodes 152 and 153 are conducting equally, equal signals appear across the two resistors. Capacitors 156 and 157 are connected across resistors 154 and 155, respectively, and act in conjunction with the resistors to filter the output signal of the diodes. If the input signals to the circuit are such that equal signals appear on the cathodes of the diodes, the diodes conduct equally, and equal negative signals will appear on the anodes thereof. If the input signals are so related that unequal signals appear on the cathodes of the diodes, as will be later explained in detail, one diode will conduct more heavily that the other; and the D.C. voltage appearing at its anode will be more negative than that appearing at the anode of the other diode.

The D.C. voltages appearing across resistors 154 and 155 also appear across resistors 158 and 160, which serve as grid resistors for two D.C. amplifiers comprising triode electron discharge devices 161 and 162. The cathodes of the triodes 161 and 162 are grounded and the anodes of the triodes 161, 162 are connected through resistors 163 and 164, respectively, to a source of D.C. voltage, which will be later described. The control grid of triode 161 receives the negative D.C. signal appearing at the anode of diode 152, and the control grid of triode 162 receives the negative D.C. signal appearing at the anode of diode 153. A capacitor 165 is connected between the juncture of resistors 154 and 155 and the juncture of resistors 158 and 160 and serves to permit the grid-to-cathode voltages of triodes 161 and 162 to be zero at the balance condition. That is, capacitor 165 causes only the difference in the voltages appearing across resistors 154 and 155 to be applied to the D.C. amplifiers, and maintains an alternating current ground at the juncture of resistors 154 and 155.

The output of the D.C. amplifiers is taken from the anodes of triodes 161 and 162 and is coupled through anti-hunt networks to the input of a power output stage. The signal appearing at the anode of triode 161 is connected through an anti-hunt network 166 and through a current limiting resistor 167 to the control grids of a pair of triode electron discharge devices 168 and 170, which are connected in parallel and have a grid resistor 171 across which the signal appears. Similarly, the signal appearing at the anode of triode 162 is connected through an anti-hunt network 172 and through a current limiting resistor 173 to the parallel-connected control grids of triode electron discharge devices 174 and 175, where the signal appears across a grid resistor 176. The cathodes of triodes 168, 170, 174, and 175 are connected through a biasing resistor 177 to the juncture of grid resistors 171 and 176. A capacitor 180 is connected between the juncture of resistors 171 and 176 and ground, and functions in a manner similar to that of the capacitor 165 previously described.

The parallel-connected anodes of triodes 168 and 170 are connected to one end of a secondary winding 181 of a transformer 182, and the parallel-connected anodes of triodes 174 and 175 are connected to the other end of the secondary winding 181. Thus, the voltage supplied to the anodes of triodes 168, 170 is 180° out of phase with the voltage supplied to the anodes of triodes 174, 175, and the triodes cannot all conduct simultaneously. The primary winding 183 of transformer 182 is connected across power input terminals 184 and 185, to which 110-volt 60-cycle alternating current may be connected from the system lines. A filament winding 186 on transformer 182 provides voltages of the proper magnitude for a filament 192 of triodes 168 and 174, and for a filament 193 of triodes 170 and 175.

One phase of a two-phase motor (such as the motor 136 shown in Fig. 4), which it is desired to have respond to a phase difference between the input signals, may be connected across output terminals 188 and 190 in the anode-cathode circuit of the output triodes. Terminal 188 is connected to the cathodes of triodes 168, 170, 174, and 175 through biasing resistor 177, and terminal 190 is connected to a center tap of the secondary winding 181 of transformer 182. A jack 191 may be connected across terminals 188 and 190 so that the output may be monitored, if desired.

The anode voltage for the D.C. amplifier triodes 161 and 162 is provided by a power supply comprising a power transformer 194 and an electron discharge device 195 of the double diode type. The primary winding of the transformer 194 is connected to power input terminals 184 and 185, and secondary windings are connected to the double diode 195 in the conventional manner to provide full wave rectification. The D.C. output of the double diode 195 is filtered by a conventional filter 196 before being applied to the anodes of triodes 161 and 162. A resistor 197 is connected as a bleeder, which permits the removal of the charge from the filter capacitors when power is removed from the circuit. A filament 198 for diodes 152, 153 and a filament 199 for triodes 161 and 162 are supplied by another secondary winding of transformer 194 in the usual manner.

For purposes of explanation, the operation of the amplifier circuit will be considered first with reference to two input voltages which are of sine wave shape in phase agreement and of such amplitude that equal signals appear across resistors 146, 147, and 148. In this case, the vector sum of the signals appearing across resistors 146 and 148 appears on the cathode of diode 152, and the vector sum of the signals appearing across resistors 147 and 148 appears on the cathode of diode 153. Therefore, the signal appearing at the cathode of diode 152 is a sine wave, whose phase agrees with the phase of the two input signals and whose amplitude is twice that of the signal appearing across resistor 146 or resistor 148. The signal appearing on the cathode of diode 153 is zero, because it is the sum of equal negative and positive signals which cancel each other. During the first half of each cycle, the cathode of diode 152 is positive with respect to its anode, and diode 152 does not conduct; during the second half of the cycle, the cathode is negative with respect to the anode, and diode 152 does conduct. This causes a voltage drop across resistor 154 and charges capacitor 156. At the same time, because there is no signal appearing at the cathode of diode 153, no current flows through resistor 155 and no charge is built up across capacitor 157. Therefore, current flows through resistors 158 and 160 in the control grid circuits of triodes 161 and 162, and the control grid of triode 162 becomes positive with respect to its cathode while the control grid of triode 161 becomes negative with respect to its cathode. Thus, triodes 161 and 162 operate in push-pull fashion to cause a signal to appear across resistors 171 and 176 in the input circuit to the power stage. Therefore, the control grids of triodes 168 and 170 tend to go positive with respect to their cathodes, while the control grids of triodes 174 and 175 tend to go negative with respect to their cathodes. In this case, it is assumed that the signals appearing across resistors 171 and 176 are of such amplitude as to cause maximum current flow through triodes 168 and 170, while causing triodes 174 and 175 to cut off.

The anodes of triodes 168 and 170 are connected to one end of the secondary winding 181 of transformer 182, and the anodes of triodes 173 and 175 are connected to the other end of the secondary winding 181. Therefore, it is apparent that when the anodes of triodes 168 and 170 are positive, the anodes of triodes 174 and 175 are negative, and vice versa. Thus, if the control grids of triodes 168 and 170 are at the same potential as the control grids of triodes 174 and 175, the current flow through triodes 168 and 170 during one half of each cycle of the A.C. input voltage is the same as that through triodes 174 and 175 during the other half of each cycle. However, in the present example, a positive signal appears on the control grids of triodes 168 and 170, while a negative signal appears on the control grids of triodes 174 and 175. Therefore, the current flow through triodes 168 and 170 exceeds that through triodes 174 and 175. This means that if one phase of the output motor 136 (not shown in Fig. 4a) is connected between terminals 188 and 190 in the cathode circuit of the output stages there is through that phase of the motor a pulse of current that corresponds in time to that portion of each A.C. input cycle when the anodes of triodes 168 and 170 are positive. During the remaining half of each cycle, when the anodes of triodes 174 and 175 are positive and the anodes of triodes 168 and 170 are negative, there will be no current flow because no positive signal appears on the control grids of triodes 174 and 175. It is noted that the other phase of the motor should be energized by 60-cycle alternating current of the same phase as that which energizes the primary winding 183 of transformer 182, supplied to the motor through a capacitor to provide the usual 90° phase shift, as is well known to those skilled in the art. Therefore, when the input signals are in phase current flows through one phase of the two-phase motor during only half of each cycle, and the motor turns in a certain direction.

Next consider the case where the input signals differ in phase by 30 degrees. In this case, the signal appearing at the cathode of diode 152, which is the vector sum of the signals appearing across resistors 146 and 148, is approximately twice as large as, and 90 degrees out of phase with, the signal appearing at the cathode of diode 153, which is the vector sum of the signals appearing across resistors 147 and 148. Thus, the control grid of triode 161 again tends to become negative and the control grid of triode 162 positive with respect to their common cathode connection, although not by as great an amount as in the first example. The control grids of triodes 168 and 170 again tend to go positive, and there is maximum current flow through these triodes during the positive portion of their anode voltage cycle. The control grids of triodes 174 and 175 tend to go negative but not by an amount sufficient to completely cut off the triodes. Therefore, there is current flow in the cathode circuit of the output power stage during both halves of each anode voltage cycle, but the current flow during one half of the cycle is approximately twice as great as that during the other half of the cycle. Thus, the output motor turns in a direction determined by the phase of the greater signal with reference to the 60-cycle current which continuously energizes one phase of the motor. In another case, when the input signals are 90 degrees displaced in phase, the signals appearing on the cathodes of diodes 152 and 153 are of equal amplitude; and the control grids of triodes 161 and 162 are at the same potential as their cathodes. Therefore, no signal appears on the control grids of output triodes 168, 170, 174, and 175, and these triodes all have maximum current flow therethrough. In this case, equal currents flow in the cathode circuit of the output stage during both halves of each anode voltage cycle; the output motor is equally energized during both halves of each cycle and, consequently, does not turn. Thus, it is apparent that a 90° phase displacement between the input signals to the amplifier is the reference displacement; and if the phase difference is less than 90°, the motor will rotate in one direction at a speed determined by the phase difference.

It is apparent from the above explanation that, when the phase difference between the input signals to the amplifier is greater than 90°, the output motor should rotate in the reverse direction. This does occur because the flow of current through the diodes 152, 153 is such as to cause the control grid of triode 161 to tend to go positive and the control grid of triode 162 to go negative. Thus, the control grids of triodes 174 and 175 tend to go positive, while the control grids of triodes 168 and 170 tend to go negative so that maximum conduction occurs through triodes 174 and 175 and reduced conduction occurs through triodes 168 and 170. Therefore, the greatest current flow through the winding of the motor connected between terminals 188, 190 occurs during the second half of each cycle, rather than during the first half, as when the phase difference was less than 90°. Therefore, the motor rotates in the opposite direction. It is noted that under conditions in which the amplitude of the input signals appearing across resistors 146, 147, and 148 are not equal, the only effect on the operation of the circuit is to reduce its sensitivity. This effect occurs because the sum and difference signals appearing at the cathodes of diodes 152 and 153 are not in quadrature, but are at a smaller angle; and consequently, motor torque is somewhat reduced.

It will be recalled that in connection with Fig. 2 it was stated that a voltage proportional to the incremental cost of generated power at a controlled station is provided from a potentiometer 68 connected across a standard voltage source 70. The voltage present on the potentiometer pick-off arm represents the incremental cost of power generated at that station. That incremental cost voltage is then multiplied by a fuel cost factor by the potentiometers 73 to provide voltages proportional to incremental heat rate, which are supplied to the function generators 74. Each function generator 74 serves to provide a direct voltage whose amplitude is proportional to the power output of a corresponding generator at which occurs the incremental heat rate corresponding to the input signal from the potentiometer 73.

Function generators of the type required for this application are well known in the art and readily available commercially. Examples of suitable devices may be found in the book Electronic Analog Computors, by Korn and Korn, McGraw-Hill Book Company, Inc., New York, New York, 1952. Although the present invention is not limited to the use of any particular function generator, apparatus that has been found to operate satisfactorily will be described hereafter with reference to Figs. 5-7.

Figure 5:
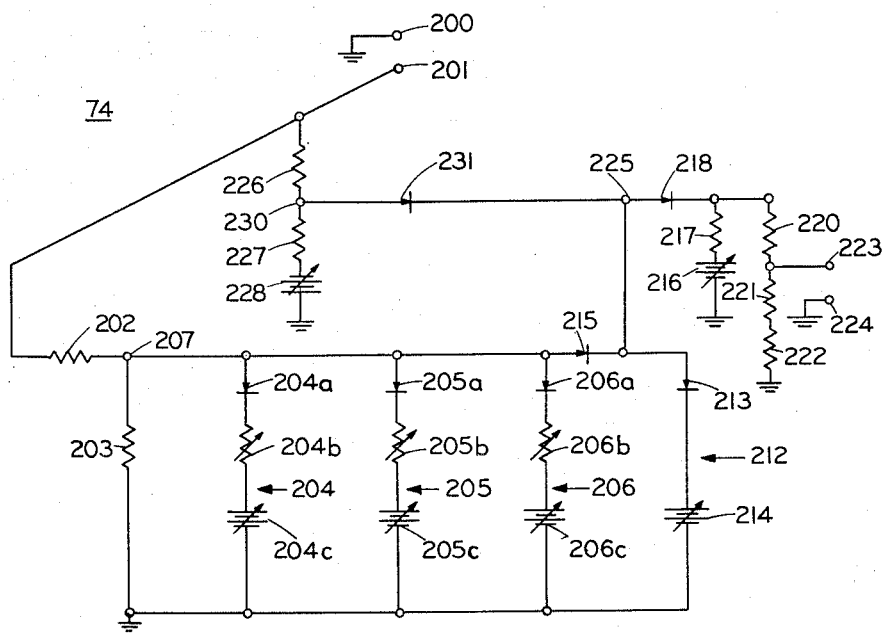
Fig. 5 is a schematic diagram of a function generator shown in block form in Fig. 2.
Figure 6:
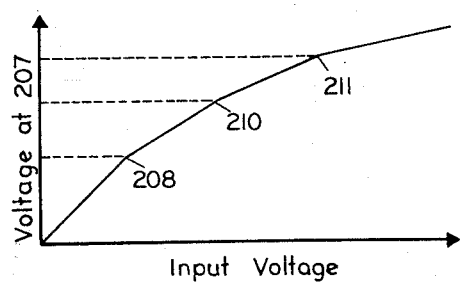
Figs. 6 and 7 are graphs useful in understanding the operation of the function generator of Fig. 5.

In effect, the function generator shown in Fig. 5 is a voltage divider comprising two resistances, one being fixed and the other variable in discrete steps, a new resistance step being introduced each time a predetermined input voltage is attained. The input signal may be supplied between a pair of terminals 200 and 201, terminal 200 being grounded; and fixed resistors 202 and 203 are connected in series between input terminal 201 and ground. The resistor 203 has a plurality of resistance arms 204, 205, and 206 connected in parallel therewith, which contain rectifier elements 204a, 205a, and 206a, respectively; variable resistances 204b, 205b, 206b, respectively; and variable direct voltage sources 204c, 205c, 206c, respectively, with a rectifier element, a variable resistance, and a variable voltage source connected in series in each arm. If the direct voltage signal supplied between the input terminals 200 and 201 is positive with respect to ground, the connections of the rectifier elements 204a, 205a, 206a and the variable voltage sources 204c, 205c, 206c are such as to oppose conduction through each of the resistance arms 204, 205, 206 until the voltage appearing across the resistor 203 is greater than the voltage of a source 204c, 205c, or 206c. Of course, if the input signal is negative, the polarities of the rectifier elements and the variable direct voltage sources would be reversed.

Looking only at that portion of the circuit thus far described, as the input voltage at the terminals 200, 201 increases from zero, the voltage at a point 207 between the resistors 202 and 203 increases proportionally until it is equal to one of the voltages provided by the variable voltage sources 204c, 205c, and 206c. Any increase of the voltage at point 207 above any one of the voltages set in by the variable voltage sources 204c, 205c, 206c causes a corresponding rectifier element 204a, 205a, 206a to conduct and changes the basic voltage divider ratio to another value; that is, when one or more of the rectifier elements 204a, 205a, 206a conducts, one or more of the variable resistances 204b, 205b, 206b is put in parallel with the fixed resistance 203. If it is assumed that the voltages set in by the variable voltage sources 204c, 205c, 206c are all different and greater than zero, a plot of the voltage at point 207 versus the input voltage would take the general form of the curve shown in Fig. 6. The intercept points 208, 210, and 211, of course, are determined by the voltages set in at the variable voltage sources 204c, 205c, 206c, and the slopes of the curves are determined by the value of resistors 202 and 203 and by the settings of the variable resistances 204b, 205b, 206b, as will be apparent to one skilled in the art.

Because the turbine whose speed level setting is controlled by the function generator has certain fixed limits of control, various limit controls are provided in the function generator. A high-limit control is provided by an arm 212 similar in function to the intercept control arms 204, 205, and 206, previously described. The high-limit control arm 212 comprises a series-connected rectifier element 213 and a source of variable direct voltage 214 connected in parallel with the arms 204, 205, 206 through a rectifier element 215. Neglecting for the moment the rectifier element 215, when the voltage at point 207 becomes greater than that set in by the variable voltage source 214, the rectifier element 213 conducts, thus maintaining the voltage at the point 207 at the value of the voltage set in by the source 214.

In order to adjust the minimum output voltage from the function generator regardless of the input voltage, a low-limit control is provided. The low-limit control comprises a source of variable direct voltage 216 and a fixed resistor 217 connected in series through a rectifier element 218 to the juncture of rectifier elements 215 and 213. The output voltage from the function generator may be taken from a voltage divider comprising resistances 220, 221, and 222 connected in series between the top of resistor 217 and ground, with a point between the resistances 220 and 221 connected to one terminal of the pair of output terminals 223 and 224, the other output terminal being grounded. It is apparent that, when the voltage present at a point 225 between the rectifier elements 215 and 213 is less than the voltage set in at the variable voltage source 216, the rectifier element 218 does not conduct. However, the variable voltage source 216 causes current to flow through the resistances 217, 220, 221, and 222 and an output signal of fixed value appears at the output terminals 223, 224. When the voltage at point 225 becomes greater than that set in at the variable voltage source 216, rectifier element 218 conducts and the output voltage then varies in the manner previously described.

One further control, known as the overload cut in control, is provided to cause the output voltage to rise more rapidly than is determined by the slope resistors 204b, 205b, 206b once the input voltage has reached a predetermined level. The overload cut in control comprises resistors 226 and 227 connected in series between input terminal 201 and a source of variable direct voltage 228 with the positive side of the variable voltage source 228 being grounded. A point 230 between resistors 226 and 227 is connected to the point 225 through a rectifier element 231 arranged to pass current from the point 231 toward the point 225. The voltage at point 230 does not affect the voltage at point 225 until it becomes greater than the voltage at point 207. The point 230 is negative until the input voltage connected between terminal 200 and 201 is equal to or greater than the voltage set in at the variable voltage source 228. As the input voltage increases beyond that point, the voltage at point 230 rises at a proportional rate until it reaches the value of the voltage at point 207. At that time, the rectifier element 231 conducts and the rectifier element 215, acting much like a switch, ceases to conduct. Any further increase in the input voltage causes the output voltage to increase by a factor determined by the voltage divider composed of resistors 226 and 227 rather than by the voltage divider composed of resistors 202 and 203 and their associated arms 204, 205, 206.

Figure 7:
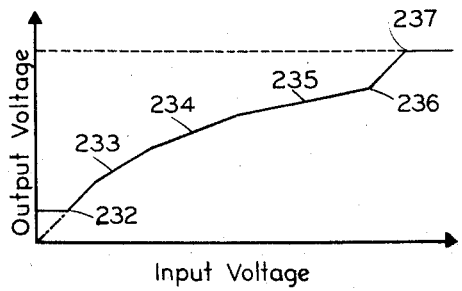

Referring now to Fig. 7, the effects of the various controls can be seen. As the input voltage increases from zero, the output voltage is constant at a predetermined value adjusted by the low-limit control. When the input voltage reaches a point 232, where the voltage at the point 207 (Fig. 5) equals the low-limit voltage as determined by the setting of the variable voltage source 216, the output voltage starts to rise with a slope determined by the ratio of the fixed resistors involved. The points 233, 234, and 235 are those at which the various resistance arms 204, 205, 206 are cut into the circuit and placed in parallel with the resistor 203, as previously described. When the voltage at the point 207 has reached another predetermined value, as at 236, the overload cut-in becomes operative and the slope of the input-output curve again changes. Finally, when the input voltage has reached a predetermined level, as at 237, the high-limit control becomes operative, the rectifier element 213 conducts, and the output voltage is held at a predetermined value.

Although the output of the function generator follows a curve that is actually a series of straight lines of various slopes, such an approximation has been found to be sufficiently accurate for the purpose. If a closer approximation is desired, it may be obtained by providing additional intercept arms similar to the arms 204, 205, and 206, to provide a greater number of straight line portions for the curve.

It is apparent to one skilled in the art that the variable voltage sources 204c, 205c, 206c, 214, 216, and 228 may be adjustable taps on the output of a conventional regulated direct current power supply. It is further apparent that the diagram shown in Fig. 5 is simplified and that various refinements may be added by one skilled in the art.

It will be recalled that the direct voltage output of each function generator 74 is supplied to one input of a balancing amplifier 75. Each balancing amplifier 75 serves to compare the output signal of the function generator with the signal that is proportional to the output of the corresponding controlled generator or, alternatively, proportional to the valve position of the turbine driving the generator. The balancing amplifier then produces a signal to cause a motor to rotate at a speed proportional to the difference between the two input signals and in a direction determined by the polarity of the difference. Although the present invention is not limited to the use of any particular balancing amplifier, one which is known to be suitable is shown in schematic form in Fig. 8.

As is seen from Fig. 8, the balancing amplifier 75 is quite similar to the tie-line load controller 20 previously described with reference to Fig. 3 and differs from the tie-line load controller primarily in that the tachometer feedback and the reference signal producing means are eliminated. Reference is also made to previously mentioned application Serial No. 395,117 for a detailed explanation of the balancing amplifier 75.

Figure 8:
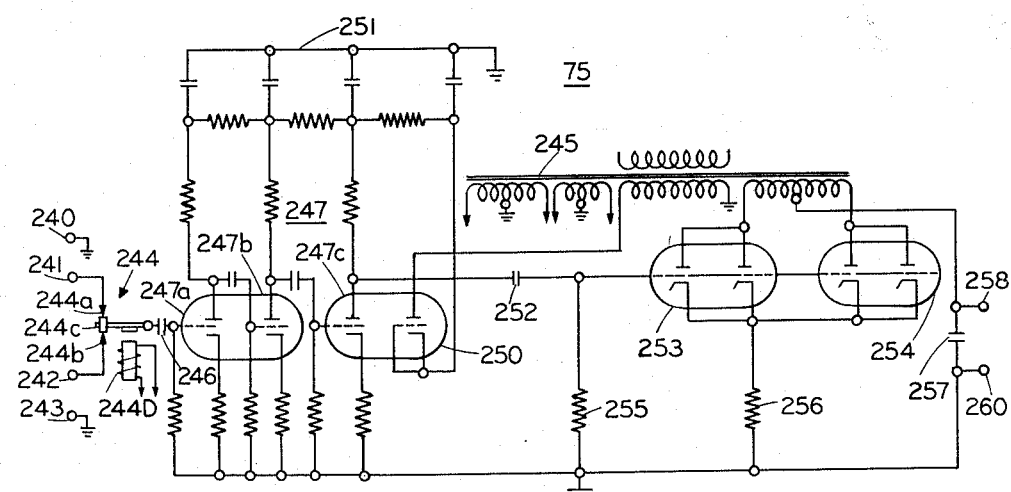
Fig. 8 is a schematic diagram of a balancing amplifier shown in block form in Fig. 2.

Referring now to Fig. 8, one of the direct voltage input signals may be supplied between terminals 240 and 241 and the other direct voltage input signal between terminals 242 and 243. As shown, the input signals should be supplied with the same polarities to the terminals 241 and 242, because the terminals 240 and 243 are grounded.

The terminals 241 and 242 are respectively connected to the two fixed contacts 244a, 244b of a conventional chopper 244 having a movable or vibrating contact 244c. The energizing coil 244d of the chopper may be connected to a secondary winding of a transformer 245 whose primary winding is connected to the system power lines. Thus, as is well known to one skilled in the art, the movable contact 244c of the chopper is switched between the fixed contacts 244a, 244b at the frequency of the voltage that energizes the operating winding 244d. The movable contact 244c of the chopper is connected through a coupling capacitor 246 to the control grid of the first stage of a conventional three-stage amplifier 247 comprising triode discharge devices 247a, 247b, 247c.

It is now apparent that, during one half of each cycle of the energizing alternating current supplied to the operating winding 244d of the chopper, the signal supplied to the control grid of the first stage 247a of the amplifier 247 is that signal supplied between the input terminals 240 and 241, while during the other half cycle the signal supplied between terminals 242 and 243 is supplied to the amplifier. Thus, whenever one of the input signals is greater than zero and the two signals are not equal, an alternating current square-wave signal will be present on the control grid of the first stage 247a of the amplifier. Of course, the amplitude and phase of that alternating current square-wave signal depend on the difference in amplitude between the two direct current input signals and the polarity of that difference.

Anode voltages may be supplied to the three-stage amplifier 247 by a half-wave rectifier 250 energized from a secondary winding on transformer 245. The direct voltage output of the rectifier 250 is filtered by a conventional resistance-capacitance filter network 251 before being supplied to the anodes of the amplifier stages 247a, 247b, 247c.

The square-wave output signal from the third stage 247c of amplifier 247 is connected through a coupling capacitor 252 to the control grids of a pair of duo-triode electron discharge devices 253 and 254 provided with a grid resistor 255. As in the tie-line load controller previously described, the anodes of the duo-triode 253 are connected together to one end of a secondary winding on transformer 245 and the anodes of duo-triode 254 are connected together to the other end of that secondary winding. The cathodes of the duo-triodes 253 and 254 are provided with a common cathode resistor 256, and the anode-cathode circuit is completed through a capacitor 257 to a center tap on the transformer secondary winding to which the anodes of the duo-triodes 253 and 254 are connected. A pair of output terminals 258 and 260 are provided on opposite sides of the capacitor 257.

As is apparent from the description of the tie-line load controller previously considered, the alternating current signal supplied to the control grids of the duo-triodes 253 and 254 is either in phase with the anode voltage of duo-triode 253 and 180° out of phase with the anode voltage of duo-triode 254, or vice versa. Thus, depending on the phase of the alternating current signal, one of the duo-triodes conducts more heavily than the other; and if one phase of a reversible two-phase motor, such as the motor 66 in the load-proportioning unit (Fig. 2), is connected between the output terminals 258 and 260, and the other phase is connected to the source that energizes the primary winding of transformer 245, there is greater current flow through the motor winding during one half cycle than during the other half cycle to cause the motor to rotate in one direction or the other. Of course, the direction in which the motor rotates is determined by the polarity of the difference between the input signals connected between terminals 240 and 241 and between terminals 242 and 243; and its speed of rotation is related to the amplitude of that difference. When there is no difference between the input signals or when there are no input signals, equal currents flow through the anode-cathode circuit of the duo-triodes during both half cycles and the motor does not rotate.

It was previously mentioned that the electronic positioning unit 76 (Fig. 2) serves to compare the phase or frequencies of two alternating current signals and, if there is a phase difference, energize one or another output circuit depending on the polarity of the phase difference. Although the invention is not limited to the use of any particular device for this purpose, one such device forms the subject matter of the copending application previously noted and is shown schematically in Fig. 9 of the present application.

Referring now to Fig. 9, the signals whose phases are to be compared, which may be taken from the rotor of selsyn 65 and from the rotor of selsyn 77 (Fig. 2), may be supplied between input terminals 265 and 266 and between input terminals 267 and 268, respectively. The signal supplied between terminals 265 and 266 will be hereafter referred to as signal "A," while that signal supplied between terminals 267 and 268 will be hereafter referred to as signal "B."

Signal A supplied between terminals 265 and 266 appears across resistors 270 and 271 of equal value connected in series between the terminals. The juncture of the resistors 270 and 271 is grounded, and it is apparent that the signals appearing across these resistors are of equal amplitude but of opposite polarity. The signal appearing across resistor 270 is connected to the control grid of a triode electron discharge device 272, and the signal appearing across resistor 271 is similarly connected to the control grid of a triode electron discharge device 273. The cathodes of the two triodes are connected together and grounded, and their anodes are connected through load resistors 274 and 275, respectively, to a +B anode voltage supply. The triodes 272 and 273 serve as limiters and are operated at zero bias, so that when signal A, which is essentially a sine wave, is supplied to the control grids thereof, the signals appearing on the anodes of the two triodes are essentially square waves of equal amplitude but opposite polarity.

Input signal B, which is supplied between terminals 267 and 268, appears across resistors 276 and 277 connected in series between the terminals. The juncture of resistors 276 and 277 is grounded, and the signal appearing across resistor 276 is connected to the control grid of a triode electron discharge device 278 whose anode is connected to the +B supply through load resistor 280. Triode 278 serves as a limited in the same manner as triodes 272 and 273 previously discussed.

Returning again to the square waves of opposite polarity appearing on the anodes of triodes 272 and 273, the signal appearing on the anode of triode 272 is supplied to the anode of a diode electron discharge device 281; and the signal appearing on the anode of triode 273 is supplied to the anode of a diode electron discharge device 282. The diodes 281 and 282 have their cathodes connected together through a pair of resistors 283 and 284 of equal value and comprise a phase comparison means. For this purpose, the square wave signal appearing on the anode of triode 278 in the signal B input circuit is supplied to the juncture of resistors 283 and 284. It is apparent that diode 281 will conduct only when the signal appearing on its anode is positive with respect to the signal appearing on its cathode, and diode 282 will conduct only when its anode is positive with respect to its cathode. Because the signals appearing on the control grids of triodes 272 and 273 are of opposite polarity and, consequently, the signals appearing on the anodes of the triodes are of opposite polarity, it is apparent that the diodes 281 and 282 cannot conduct simultaneously but may conduct during alternate half-cycles of input signal A if their cathodes are of proper polarity to allow conduction at those times. The polarity of the cathodes of the diodes depends, of course, on input signal B and, whether this signal is so related in polarity to input signal A as to allow the diodes to conduct, depends upon the phase difference between the two signals.

If it is assumed that the phase relationship between signals A and B is such that the diode 281 conducts during a portion of each alternate half-cycle, and diode 282 conducts for an equal portion of the other alternate half-cycles, equal D.C. signals appear across resistors 283 and 284. The D.C. signals appearing across resistors 283 and 284 are filtered by conventional filters 285 and 286, respectively, to provide two D.C. voltages whose relative amplitudes depend on the relative lengths of the conduction periods of diodes 281 and 282 during alternate half-cycles of input signal A.

The filtered D.C. output of diode 281 is coupled to the control grid of a gas-filled tetrode discharge device 287, such as a thyratron, and the filtered D.C. output of diode 282 is similarly connected to the control grid of a similar gas-filled discharge device 288. The signals appear across grid resistors 290 and 291 and are coupled to the control grids through the usual current-limiting resistors 292 and 293, respectively. The control grids of thyratrons 287, 288 are connected together through capacitors 294 and 295, which serve substantially to prevent A.C. signals from appearing on the control grids and the juncture of capacitors 294 and 295 is connected to the cathodes of the tubes.

Negative bias is provided on the control grids of thyratrons 287 and 288 by a circuit which comprises a conventionally-connected diode rectifier 296 having the cathode thereof connected to the juncture of a pair of load resistors 297 and 298 that are in turn connected in series across a secondary winding 300a of a power transformer 300. The diode 296 is supplied from the secondary winding 300a in conventional manner to provide a half-wave rectified D.C. voltage across a potentiometer 302 connected in parallel with a capacitor 303; and the movable pick-off contact arm of potentiometer 302 is connected to the juncture of resistors 290 and 291 in the control grid circuits of thyratrons 287 and 288. The cathodes of thyratrons 287, 288 are also connected through a variable portion of potentiometer 302 to the juncture of resistors 290 and 291. Therefore, if there is a difference between the filtered D.C. outputs of diodes 281 and 282, one of the control grids of thyratrons 287, 288 is more negative with respect to the common cathode connection than the other.

The anodes of thyratrons 287 and 288 are supplied with alternating current, and the devices, which are to be actuated by a phase difference other than a reference value of phase difference between the input signals, are connected in the anode-cathode circuits of the thyratrons. In this case, the operating winding of a relay 304 is connected in the anode circuit of thyratron 287, and the operating winding of a second relay 305 is connected in the anode circuit of thyratron 288. It is to be understood, however, that devices other than relay operating windings may be connected in the anode circuits or in the cathode circuits, as desired, of the thyratrons, or the thyratrons themselves may be connected as switches in an operating circuit. The operating windings of relays 304, 305 are connected in parallel with capacitors 306 and 307, respectively. In the present case, the relays 304 and 305 may be connected to supply energizing current to the synchronizing motor 78 (Fig. 2) to cause it to rotate in one direction or the other.

The thyratron anodes are connected through a resistor 308 and through the contacts of a time delay relay 310 to the end of transformer secondary winding 300a remote from that to which the thyratron cathodes are connected.

The output circuit thus far described is seen to comprise a pair of thyratrons 287, 288 connected in parallel across the secondary winding 300a of transformer 300. The input circuits provide signals on the control grids of the thyratrons that may be of opposite polarity with respect to the common cathode connection. The signals appearing on the control grids of the thyratrons have been reasonably well filtered. However, in order to have fast response throughout the circuit, some ripple must appear on those control grids. If the ripple is completely removed, it is possible that unstable operation may result under certain conditions. To prevent such operation and to assure positive firing of the thyratrons, means are provided to prevent the thyratrons from firing except at approximately the peak values of their anode voltages.

The operation of this portion of the circuit is based upon the fact that the shield grids of gas-filled electron discharge devices such as thyratrons are quite effective in preventing the discharge devices from firing when the shield grids are negative with respect to the cathodes. The circuit comprises an electron discharge device 311 of the diode type having its anode connected through a resistor 312 to the shield grids of the thyratrons 287, 288. The cathode of diode 311 is connected to the common cathode connection of the thyratrons and is also connected through series-connected resistors 313 and 314 to the anode supply voltage of the thyratrons. A resistor 315, having a large ohmic value relative to resistors 313 and 314, is connected across diode 311, and a capacitor 316 is connected from the anode of the diode to the juncture of resistors 313 and 314. The circuit comprising resistors 313 and 315 and capacitor 316 is a relatively long time constant circuit; and the circuit comprising resistor 313, capacitor 316, and diode 311 is a relatively short time constant circuit. Therefore, during part of the portion of each cycle when the juncture of resistors 313 and 314 is positive with respect to the cathode of the diode 311, the diode conducts and capacitor 316 charges to substantially the peak value of the A.C. voltage appearing across resistor 313. During the remainder of each cycle, capacitor 316 discharges through the long time constant circuit comprising resistors 313 and 315, and thus holds the shield grids of the thyratrons 287, 288 negative with respect to the cathodes thereof. The time constants of the circuit may be so adjusted that the shield grids are biased negatively at all times except when the voltage across resistor 313 is near its positive maximum, at which time the thyratron anodes are also near their positive maximum values. Thus, the thyratrons tend to remain cut off except for a brief portion of each cycle when their anodes are at or near their positive maximum values. In this manner, positive control of the time of firing of the thyratrons is assured.

Power may be supplied to the circuit from the system 60-cycle alternating current powerline through a switch 317 to the primary winding 300b of transformer 300. The operating winding of time delay relay 310, through whose contacts the anodes of the thyratrons 287, 288 are connected, may be connected in parallel with primary winding 300b of the transformer. A conventional rectifier supplies anode voltage to triodes 272, 273, 281, and 282, and comprises an electron discharge device 318 of the full-wave rectifier type connected in the usual manner between secondary windings 300c and 300d of transformer 300. The D.C. voltage output of the rectifier is filtered by a conventional filter 320 before being supplied to the anodes of the triodes.

It is assumed for purposes of illustration that the input signals and the values of the various circuit constants are such that signals of equal amplitude appear across resistors 283 and 284 and on the anode of the triode 278. However, if the signal appearing on the anode of the triode 278 is not equal to the signals appearing across resistors 283 and 284, the basic operation of the circuit will be unchanged. When sine wave input signals A and B in phase with each other are impressed on the control grids of triodes 272 and 273, the signals appearing at the anodes of those triodes are substantially square waves of opposite phase. Of course, these square wave signals also appear on the anodes of diodes 281 and 282. When signal B is in phase with signal A, a square wave signal appears on the anode of triode 278, which is in phase with that signal appearing on the anode of triode 272 and on the anode of diode 281. The square wave signal derived from signal B appears on the cathodes of diodes 281 and 282. As is well known, a diode conducts only when its anode is positive with respect to its cathode. Therefore, it is apparent that when signals A and B are in phase with each other, diode 281 never conducts, because the signals appearing on its anode and cathode are of equal amplitude and agree in phase, and at no time is the anode positive with respect to the cathode.

However, the signals appearing on the anode and cathode of diode 282 are 180° out of phase with each other; and therefore, during one-half of each cycle, when the anode is positive and the cathode is negative, diode 282 conducts. Thus, there is a voltage drop across resistor 283 and that D.C. voltage is filtered and applied to the control grid of thyratron 287. In this instance, when diode 281 has not conducted and no D.C. voltage has been developed across resistor 284, equal signals appear across grid resistors 290 and 291 in the input circuits to thyratrons 287 and 288. The control grid of thyratron 287 tends to become positive and the control grid of thyratron 288 tends to become negative with respect to the common cathode connection. Thus, thyratron 288 is not permitted to fire, but thyratron 287 is permitted to fire. When the alternating potential impressed on the anode of thyratron 287 becomes sufficiently positive, and the negative potential impressed on the shield grid by the action of capacitor 316 nears zero, thyratron 287 fires and causes current to flow through the operating winding of relay 304 in its anode circuit. Because the anode of the thyratron is connected to an A.C. voltage source, it does not conduct continuously; and as its anode potential decreases toward zero and its cathode potential becomes less negative with respect thereto, it ceases to conduct. However, capacitor 306, which is connected across the operating winding or relay 304, serves to keep the operating winding continuously energized, even though thyratron 287 conducts for only approximately one-quarter cycle out of each cycle. Thus, the relay 304 closes while relay 305 remains open.

Consider now the case when signal B leads signal A in phase by 60°. In that case, the signals appearing on the anodes of diodes 281 and 282 are substantially square waves of opposite phase, as in the example previously discussed. However, when there is a 60° phase difference between signals A and B, the square wave signal appearing on the anode of triode 278, and hence the signal appearing on the cathodes of diodes 281 and 282, is displaced in phase by 60° from the square wave signal appearing on the anode of diode 282. Thus, the anode of diode 281 is positive with respect to its cathode only during approximately one-sixth of each cycle, and so diode 281 conducts only for approximately one-sixth of each cycle. It is also apparent that the anode of diode 282 is positive with respect to its cathode during approximately one-third of each cycle, and diode 282 conducts during approximately one-third of each cycle. Therefore, because diode 282 conducts for approximately one-third of each cycle, and diode 281 conducts only for approximately one-sixth of each cycle, the voltage appearing at the output of filter 285 is approximately twice that appearing at the output of filter 286. There is a voltage drop across grid resistors 290 and 291 which again makes the control grid of thyratron 287 positive and the control grid of thyratron 288 negative with respect to the common cathode connection, although the amplitudes of these positive and negative voltages are not as great as was the case when the input signals were in phase agreement. Thyratron 287 again conducts, while thyratron 288 is cut off, and thus the relay 304 is again actuated.

Let us consider now the case when the phase difference between signals A and B is 90°, which, in the particular embodiment of the invention illustrated, is taken as the reference phase difference. In this case, the square waves appearing on the anode and cathode of diode 281 are 90° out of phase with each other, and it is apparent that diode 281 conducts during approximately one-quarter of each cycle. Similarly, the square waves appearing on the anode and cathode of diode 282 are 90° out of phase with each other and diode 282 conducts during approximately one-quarter of each cycle. Thus, equal positive voltages appear at the outputs of the filters 285 and 286, and there is voltage drop across grid resistors 290 and 291. Thus, neither of the control grids of thyratrons 287 and 288 is positive with respect to its cathode, neither thyratron conducts, and neither of the relays 304, 305 closes. Thus, it is apparent that when there is a 90° phase difference between input signals A and B, they have attained the reference or desired phase relationship.

It is apparent from the examples thus far considered that when the phase difference between the input signals is less than 90°, the operating winding of relay 304 is energized. Therefore, it follows that when the phase difference between the input signals is greater than 90°, the operating winding of relay 305 should be energized. That this effect does occur will be seen from a consideration of the operation of the circuit when the phase difference between signals A and B is 150°. In that case, the square wave on the anode of diode 281 is displace in phase by 150° from the square wave appearing on its cathode. Thus, the anode is positive with respect to the cathode for approximately five-twelfths of the cycle; and therefore, the diode 281 conducts for five-twelfths of each cycle. On the other hand, the square wave impressed on the anode of diode 282 is only 30° out of phase with the square wave impressed on its cathode; and therefore, diode 282 conducts for only approximately one-twelfth of each cycle. Thus, the voltage built up across the filter 286 of diode 281 is approximately five times as large as that built up across the filter 283 of diode 282. The current flowing through grid resistors 294 and 295, in this case, makes the control grid of thyratron 288 positive and the control grid of thyratron 287 negative with respect to their common cathode connection. Thyratron 288 conducts during approximately one-quarter of each cycle of its plate voltage, but thyratron 287 remains cut off. So long as thyratron 288 conducts during each cycle, the operating winding of relay 305 remains energized because of the capacitor 307 connected thereacross.

When the input signals are phase displaced by 180°, the square waves impressed on the anode and cathode of diode 281 are 180° out of phase with each other; and therefore, diode 281 conducts during one-half of each cycle. However, the square waves impressed on the anode and cathode of diode 282 are exactly in phase with each other; and, therefore, the anode is never positive with respect to the cathode and diode 282 does not conduct. Thus, the signals appearing across grid resistors 290 and 291 make the control grid of thyratron 288 positive and the control grid of thyratron 287 negative with respect to the common cathode connection, and thyratron 288 conducts during each cycle while thyratron 287 remains cut off. Thus, again, the operating winding of relay 305 is energized and the operating winding of relay 304 remains unenergized.

It is now apparent that as the phase difference between input signals A and B decreases from 90° toward zero, the D.C. voltage applied to the control grid of thyratron 287 becomes more positive with respect to its cathode; and the voltage applied to the control grid of thyratron 288 becomes more negative with respect to its cathode, until the positive and negative grid voltages reach their maximum values when the phase difference between the input signals is zero. Similarly, as the phase difference between the input signals increases above 90°, the control grid of thyratron 288 becomes more positive and the control grid of thyratron 287 becomes more negative with respect to their common cathode connections, until the maximum positive and negative voltages are reached when the input signals are displaced in phase by 180°. As the phase difference increases above 180°, the voltage differences between the control grids decreases, but the control grid of thyratron 288 still remains positive and the other control grid remains negative until the signals are phase displaced by 270°. A phase displacement of 270° is the equivalent of a phase displacement of 90°, and is a reference point. At this point, diodes 281 and 282 conduct for equal portions of each cycle and neither thyratron 287 nor 288 conducts. As the phase difference between the signals continues to increase to 300°, the relationships are such as to cause thyratron 287 to conduct, as in the examples previously discussed, when the phase difference is less than 90°. Thus, it is seen that when the phase difference between the signals is greater than 90°, the operating winding of relay 305 is energized, and when the phase difference between the signals is less than 90°, the operating winding of relay 304 is energized. In practice, the fact that there is a second reference point at a phase displacement of 270° is of little importance because any phase displacement from the 90° reference value causes one of the relays to be actuated. This, in turn, causes the synchronizing motor 78 (Fig. 2) to rotate at such a speed that the phase difference between the input signals from the selsyns 65 and 77 maintain the reference 90° phase displacement.

It was previously mentioned that a bias voltage is applied to the control grids of thyratrons 287 and 288 from the movable contact pick-off arm of potentiometer 302. By adjusting the contact pick-off arm and thereby varying the negative bias supplied to the control grids, the "dead-band" of the circuit may be adjusted. That is, when potentiometer 302 is so set that a large negative bias is applied to the control grids of thyratrons 287, 288, the positive signal appearing at either of the control grids in response to a phase displacement between the input signals from the 90° reference point must exceed a certain amount in order to overcome this negative bias. Stating it another way, by adjusting potentiometer 302, the circuit may be made unresponsive to phase deviations between the input signals of less than a certain amount. If the negative bias applied to the thyratron control grids is small, the circuit becomes quite sensitive and will respond to very small phase differences from the reference value.

For a more detailed description of the electronic positioning unit, reference may be made to the aforementioned application Serial No. 395,118.

Figure 10:
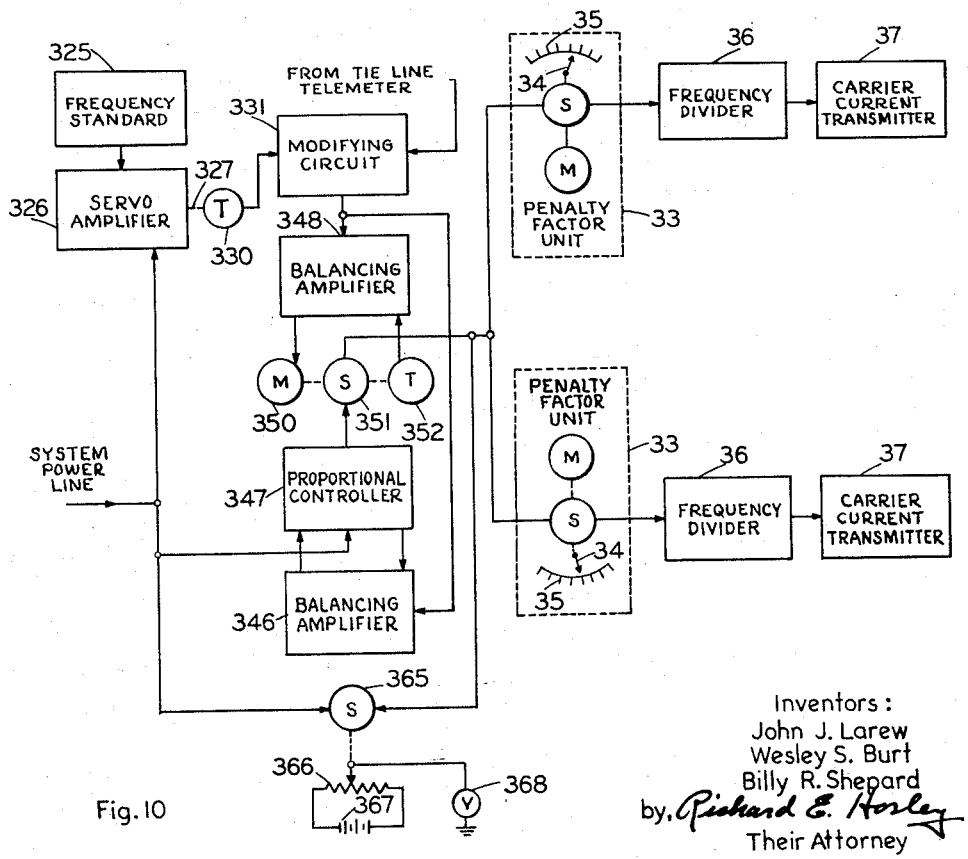
Fig. 10 is a schematic block diagram of a modification of the detector means and control signal producing means installed at a central control station.

Fig. 10 illustrates a modified form of control signal producing means for location at a central control station. The apparatus there shown differs from that previously described with reference to Fig. 1 in that the frequency deviation signal $\Delta f$ and the load deviation signal $\Delta w$ are in the form of direct voltages and are combined to provide the area requirement signal while in that direct voltage form rather than in the form of shaft rotations as in the apparatus of Fig. 1. After the area requirement signal is obtained, it is translated into a control signal whose frequency varies from the system frequency in accordance with the area requirement signal or the change in incremental cost of generated power.

The apparatus to be described in connection with Fig. 10 also differs from that shown in Fig. 1 in that it embodies means for providing both proportional and reset action. Proportional action is similar to that control known in the electric power industry as fringe action and is taken to mean a high speed correction of generation to correct quickly a predetermined portion of the area requirement. Reset action, which is similar to the control known as sustained action, means a slower correction which eventually will correct for the entire area requirement. The combined effect of the two actions is initially to make a rapid correction of a predetermined portion of the area requirement followed by a slower correction until the entire area requirement is corrected. These controls or actions are desirable because of the inherent limitations in turbine generators as to the rate at which their output can be changed.

Referring now to Fig. 10, a conventional frequency standard 325, similar to the frequency standard 24 previously discussed, provides to one input of a servo amplifier 326 an alternating current signal having a standard frequency $f_s$. The second input to the servo amplifier 326 is from the system power line having the actual system frequency $f_a$. The servo amplifier 326, which is similar to servo amplifier 23 previously described and shown in Figs. 4 and 4a, services to compare the standard frequency $f_s$ with the actual system frequency $f_a$ and produce rotation of an output shaft 327 at a speed proportional to the frequency difference ($\Delta f = f_s - f_a$) and in a direction determined by the polarity of the difference.

The shaft 327 is mechanically connected to drive a tachometer generator 330. As the shaft 327 rotates at a speed proportional to the frequency difference $\Delta f$, the tachometer generator 330 provides a direct current output signal which is proportional to that frequency difference $\Delta f$ and whose polarity is determined by the polarity of $\Delta f$. The direct current signal from the teachometer 330 proportional to $\Delta f$ is supplied to a modifying circuit, shown in Fig. 10 as block 331, to which is also supplied a signal from conventional telemeter receivers or the like proportional to the actual tie-line load $w_a$. The modifying circuit 331, which is shown in detail in Fig. 11, serves to provide the tie-line load deviation signal $\Delta w$, to modify the frequency deviation signal $\Delta f$ by a proportionality constant $k$, and to combine the two signals in the proper manner into the area requirement signal $(k\Delta f/\Delta w)$.

Figure 11:
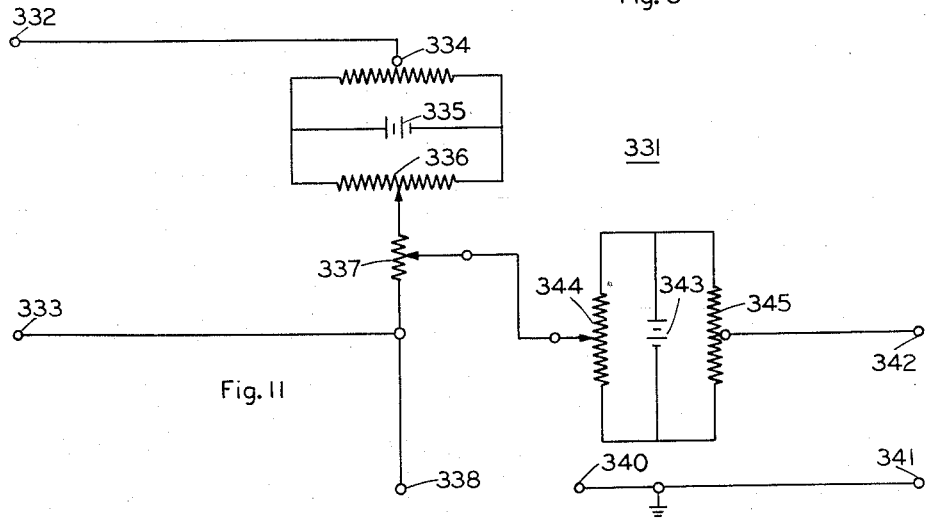
Fig. 11 is a schematic diagram of the modifying circuit shown in block form in Fig. 10.

Referring now to Fig. 11, the direct voltage signal proportional to $\Delta f$ may be supplied from the tachometer to the modifying circuit 331 between terminals 332 and 333. The $\Delta f$ signal supplied to the circuit may be modified in two ways; first, a positive or negative direct voltage of predetermined value may be added to it, and second, the resulting signal may be modified by selecting only a portion of it for combination with $\Delta w$ signal.

The first modification is accomplished by means of a resistor 334, a direct voltage reference source 335, such as a mercury cell, and a potentiometer 336 all connected in parallel. The terminal 332 is connected to a center tap on the resistor 334, and the terminal 333 is connected to the movable contact of potentiometer 336 through a potentiometer 337 and to an output terminal 338. Another output terminal 340 is grounded. The arrangement of resistor 334, standard source 335, and potentiometer 336 permits either a positive or negative voltage derived from reference source 335 to be added to the $\Delta f$ signal supplied between input terminals 332 and 333. Such an arrangement is desirable in order to correct for any accumulated frequency error that may result after a long period of operation in certain fashions, as will be apparent to those skilled in the art.

The tie-line load deviation signal $\Delta w$ is also provided in the modifying circuit 331 and is added to the modified frequency deviation signal $k\Delta f$. The actual tie-line load signal from the telemeter receivers (not shown) may be connected between a pair of terminals 341 and 342, the terminal 341 being grounded. The predetermined or scheduled tie-line load signal $w_s$ is derived from a direct voltage reference source 343, such as a mercury cell, across which are connected a potentiometer 344 and a fixed resistor 345. A center tap on fixed resistor 345 is connected to terminal 342. The movable contact arm of potentiometer 344 is connected to the movable contact arm of potentiometer 337.

By means of the arrangement of standard source 343, potentiometer 344, and center tapped resistor 345, a voltage may be provided on the movable arm of potentiometer 344 that is proportional to $(w_s - w_a)$ with the value $w_s$ being determined by the setting of the contact arm of the potentiometer 344. It is apparent the center tapped resistor 345 permits the scheduled tie-line voltage $w_s$ to be made either positive or negative to indicate power flow out of the controlled area or power flow into the controlled area.

The signal $\Delta w$ proportional to tie-line load deviation is supplied from the movable contact arm of potentiometer 344 to the movable contact arm of potentiometer 337, one end of which is connected to output terminal 338. The potentiometer 337 permits multiplying the frequency deviation signal $\Delta f$ by a factor $k$ so that when the load changes in a remote area, the generation of the local controlled area will not be varied, as was previously explained. The load deviation signal $\Delta w$ is added to the frequency deviation signal $k\Delta f$ so that the signal present between the output terminals 338 and 340 is proportional to $(k\Delta f/\Delta w)$, the area requirement signal.

Referring again to Fig. 10, the area requirement signal $(k\Delta f/\Delta w)$ from the modifying circuit 331 is utilized to provide the reset and proportional actions previously described. Proportional control is provided by a balancing amplifier 346 and a proportional controller 347, while the reset action is provided by a balancing amplifier 348 and by a reversible motor 350, a differential selsyn 351, and a tachometer generator 352 associated with the balancing amplifier 348.

Looking first at the means for providing proportional action, the area requirement signal $(k\Delta f + \Delta w)$ is supplied to one input of the balancing amplifier 346, which is similar to the balancing amplifier 75 previously discussed and shown in Fig. 8. The second input or feedback signal to the balancing amplifier 346 is provided by the proportional controller 347 and the output signal from the balancing amplifier is supplied to the proportional controller. The output signal from the balancing amplifier 346 is an alternating voltage whose amplitude and phase are related to the difference between the direct voltage input signals thereto and the polarity of that difference.

Figure 12:
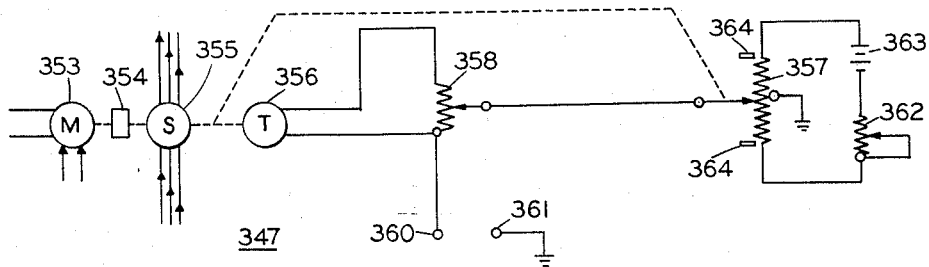
Fig. 12 is a schematic diagram of the proportional controller shown in block form in Fig. 10.

Referring now to Fig. 12, which shows the circuit diagram of the proportional controller 347, the alternating current output of the balancing amplifier 346 is supplied to one phase of a conventional reversible two-phase motor 353, the other phase of which may be energized from the system power lines. The motor 353 is mechanically connected through conventional gear reducing and slip clutch mechanisms 354 to the rotor of a differential selsyn 355. The stator windings of the differential selsyn 355 are connected to the system power lines having frequency $f_a$. Therefore, as the motor 353 turns the rotor of the selsyn 355, the signal present on the rotor windings thereof has a frequency equal to the power system frequency $f_a$ that energizes the stator plus or minus the speed of rotation of the rotor, with certain limitations that will be presently described.

The rotor windings of the differential selsyn 355 are connected to the stator windings of differential selsyn 351 (Fig. 10). Thus, the stator of selsyn 351 is energized by an alternating current signal having a frequency equal to the system frequency $f_a$ plus or minus the rate of rotation of the rotor of selsyn 355 in the proportional controller. The selsyn 351 provides on its rotor the control signal that is sent to each controlled generating station as will be hereafter described.

Referring again to Fig. 12, the rotor of the selsyn 355 is mechanically connected to a tachometer generator 356 and to the movable contact arm of a potentiometer 357. A potentiometer 358 is connected across the output of the tachometer 356 and the direct voltage appearing across the potentiometer 358 is proportional to the speed of rotation of the tachometer 356. One end of the potentiometer 358 is connected to an output terminal 360 and another output terminal 361 is grounded.

The movable contact arm of potentiometer 358 is electrically connected to the movable arm of potentiometer 357 which is mechanically driven by the selsyn 355. The potentiometer 357, having a grounded center tap, is connected in series with a variable resistance 362 across a reference voltage source 363, such as a mercury cell. The voltage present on the movable contact arm of potentiometer 357 is added to the voltage present across a portion of potentiometer 358 to provide a direct voltage output signal between terminal 360 and 361 which is fed back to the balancing amplifier 346 (Fig. 10).

The amount of movement of the movable arm of potentiometer 357 is limited by a pair of fixed stops 364 located one at each end of the potentiometer. When the movable arm of the potentiometer comes into contact with one of the stops 364, rotational movement of the rotors of selsyn 355 and tachometer 356 are stopped. The motor 353 is not damaged by this action because of the slip clutch mechanism 354 through which it drives the selsyn, the tachometer and the arm of potentiometer 357. The fixed stops 364 serve to limit the total amount of correction that can be applied through proportional action on either side of the operation point of the system. The purpose of variable resistor 362 is to control the percent of the area requirement that is corrected at high speed through the action of the proportional controller; that is, if the variable resistance 362 is so adjusted that a large voltage appears across potentiometer 357, the output voltage from the proportional controller that is fed back to the balancing amplifier 346 may be made equal to the area requirement signal with only a small amount of movement of the movable pick-off arm of the potentiometer 357. On the other hand, if a small voltage appears across the potentiometer 357, a greater amount of movement of the contact arm, and hence a greater number of turns of the rotor of selsyn 355, are required to match the voltage between the output terminals 360 and 361 with the area requirement voltage provided to the balancing amplifier 346.

The purpose of tachometer 356 is to limit the speed of rotation of the motor 353 by providing negative feedback to the motor. Although the tachometer 356 is not absolutely necessary to the operation of the system, it lends stability to the closed loop servo of the proportional controller and balancing amplifier and its use is considered preferable.

Referring again to Fig. 10, the area requirement signal ($k\Delta f+\Delta w$) is supplied from the modifying circuit 331 to balancing amplifier 348. The balancing amplifier 348, which is similar to the balancing amplifier 346 previously described, serves to compare the area requirement signal with the direct voltage signal obtained from tachometer 352. The output of balancing amplifier 348, which is an alternating voltage whose amplitude and polarity are related to the difference between the area requirement signal and the tachometer feedback signal, energizes a conventional reversible two-phase motor 350 which is mechanically connected to the rotor of selsyn 351 and to tachometer 352.

It is apparent that the tachometer 352 provides a feedback voltage to the balancing amplifier 348 that is proportional to the rate of rotation of the motor 350, which in turn may be proportional to the area requirement signal ($k\Delta f+\Delta w$). However, in order to provide generation correction at a low rate of speed without any limit as to the amount of correction possible, it is preferred that the motor 350 have an inherent speed limitation and that reduction gearing be utilized between the motor 350 and the selsyn 351 and tachometer 352, if necessary, to limit the rate of correction. Thus, the rotor of selsyn 351 is rotated by motor 350 at a rate of speed determined either by the area requirement signal or by the inherent speed limitation of the motor 350 if the area requirement signal is large. Because the stator of selsyn 351 is energized by a voltage derived from the proportional controller, the frequency of the voltage present on the rotor of the selsyn is equal to the stator energizing voltage frequency plus or minus the rate of rotation of the motor 350. Thus, the rotor voltage, which is the system control signal, has a frequency equal to the system frequency $f_a$ plus a part or all of the area requirement signal frequency ($k\Delta f+\Delta w$). If the area requirement signal is small or is changing at a rate less than that determined by the speed limitation of motor 350, all of the area requirement signal is added to the system frequency $f_a$ to provide a system control signal like that of the embodiment shown in Fig. 1. However, if the area requirement is large or is changing rapidly, only a portion of the area requirement signal appears in the control signal as determined by the limits of proportional and reset actions.

The control signal is supplied from the rotor of selsyn 351 to penalty factor units 33 in the same manner as in the system described with reference to Fig. 1. The signal from the penalty factor units 33 may then be provided to frequency dividers 36 and carrier current transmitters 37 or other conventional devices for transmission to each controlled generating station in the usual manner. The equipment at each controlled station may be the same as that previously described with reference to Fig. 2.

In order to provide a visual indication of system conditions (such as incremental cost) to an operator at the central control station, the output of the selsyn 351 is also supplied to the rotor windings of a selsyn 365, the stator windings of which are energized from the system power lines. When the frequency of the signal supplied to the rotor of the selsyn differs from that supplied to the stator windings, the rotor rotates at a speed determined by the frequency difference. The rotor of selsyn 365 is mechanically connected to the movable contact arm of a potentiometer 366 which is connected across a standard voltage source 367. A voltmeter 368 is connected to the arm of the potentiometer 366 to indicate the voltage present on the arm. Of course, the scale of the voltmeter may be calibrated in terms of either system load or incremental cost, as in the examples previously considered.

It is now apparent that the control station apparatus described with reference to Fig. 10 embodies the same advantages as that shown in Fig. 1, and in addition, embodies various controls to prevent changing the generation output of the controlled stations at a faster rate than the individual generators can accommodate safely. Of course, if the system load changes relatively slowly, the apparatus shown in Figs. 1 and 10 operate in essentially the same manner. Both embodiments attain the objectives set forth.

It is apparent that many changes and modifications may be made by one skilled in the art, and hence it is intended by the appended claims to cover all such modifications as fall within the true spirit and scope of the invention.

What we claim as new and desire to secure by Letters Patent of the United States is:

1. An electric power control system for controlling the generation of a power system having at least one generating station and a plurality of generators, the system comprising means responsive to a difference between an actual condition of said system and a desired condition of said system for producing a system control signal a characteristic of which varies in accordance with a change in incremental cost of generated power necessary to bring said actual condition to said desired condition, means at each said generating station for converting said system control signal to economic control signals representing change in generation of each said generator in said station corresponding to said change in incremental cost, and means responsive to said economic control signals for varying the generation of said generators in accordance therewith.

2. An electric power control system for controlling the generation of a power system having at least one generating station and a plurality of generators, the system comprising means responsive to a difference between an actual condition of said system and a desired condition of said system for producing a continuous system control signal a characteristic of which varies in accordance with a change in incremental cost of generated power necessary to bring said actual condition to said desired condition, means at each said generating station for converting said continuous system control signal to economic control signals representing change in generation of each said generator in said station corresponding to said change in incremental cost, and means responsive to said economic control signals for varying the generation of said generators in accordance therewith.

3. An electric power control system for controlling the generation of a power system having at least one generating station and a plurality of generators, the system comprising means responsive to a difference between an actual condition of said system and a desired condition of said system for producing a system control signal a characteristic of which varies in accordance with a change in incremental cost of generated power necessary to bring said actual condition to said desired condition, means at each said generating station for converting said system control signal to economic control signals representing change in generation of each said generator in said station corresponding to said change in incremental cost, and means for each generator responsive both to said system control signal and to said economic control signal for varying the generation of said generator in accordance therewith.

4. An electric power control system for controlling the generation of a power system having at least one generating station and a plurality of generators, the system comprising means responsive to a difference between an actual condition of said system and a desired condition of said system for producing a system control signal a characteristic of which varies in accordance with a change in incremental cost of generated power necessary to bring said actual condition to said desired condition, means at each said generating station for converting said system control signal to economic control signals representing change in generation of each said generator in said station corresponding to said change in incremental cost, and means for each generator in said station for varying the generation of said generator at a relatively fast rate in response to said system control signal and at a relatively slow rate in response to said economic control signal.

5. An electric power control system for controlling the generation of a power system having at least one generating station and a plurality of generators, the system comprising means responsive to a difference between an actual condition of said system and a desired condition of said system for producing a deviation signal proportional to said difference, means for producing a control signal, means for utilizing a predetermined proportion of said deviation signal to vary at a relatively fast rate a characteristic of said control signal, means for utilizing all of said deviation signal to vary at a relatively slow rate said characteristic of said control signal, and means at each said generating station responsive to said control signal for varying the generation of each said generator therein in accordance with said varying characteristic of said control signal.

6. An electric power control system for controlling the generation of a power system having at least one generating station and a plurality of generators, the system comprising means responsive to a difference between an actual condition of said system and a desired condition of said system for producing a deviation signal proportional to said difference, means for producing a continuous control signal, means for utilizing a pre-determined proportion of said deviation signal to vary at a relatively fast rate a characteristic of said continuous control signal, means for utilizing all of said deviation signal to vary at a relatively slow rate said characteristic of said continuous control signal, and means at each said generating station responsive to said continuous control signal for varying the generation of each said generator therein in accordance with said varying characteristic of said control signal.

7. An electric power control system for controlling the generation of a power system having at least one generating station and a plurality of generators, the system comprising means responsive to a difference between an actual condition of said system and a desired condition of said system for producing a deviation signal representing a change in incremental cost of generated power necessary to bring said actual condition to said desired condition, means for producing a system control signal, means for utilizing a predetermined proportion of said deviation signal to vary at a relatively fast rate a characteristic of said system control signal, means for utilizing all of said deviation signal to vary at a relatively slow rate said characteristic of said system control signal, means at each said generating station for converting said system control signal to economic control signals representing change in generation of each said generator in said station corresponding to said change in incremental cost, and means responsive to said economic control signals for varying the generation of said generators in accordance therewith.

8. An electric power control system for controlling the generation of a power system having at least one generating station and a plurality of generators, the system comprising means responsive to a difference between an actual condition of said system and a desired condition of said system for producing a deviation signal representing a change in incremental cost of generated power necessary to bring said actual condition to said desired condition, means for producing a continuous system control signal, means for utilizing a predetermined proportion of said deviation signal to vary at a relatively fast rate a characteristic of said continuous system control signal, means for utilizing all of said deviation signal to vary at a relatively slow rate said characteristic of said continuous system control signal, means at each said generating station for converting said system control signal to economic control signals representing change in generation of each said generator in said station corresponding to said change in incremental cost, and means responsive to said economic control signals for varying the generation of said generators in accordance therewith.

9. An electric power control system for controlling the generation of a power system having at least one generating station and a plurality of generators, the system comprising means responsive to a difference between an actual condition of said system and a desired condition of said system for producing a deviation signal representing a change in incremental cost of generated power necessary to bring said actual condition to said desired condition, means for producing a system control signal, means for utilizing a predetermined proportion of said deviation signal to vary at a relatively fast rate a characteristic of said system control signal, means for utilizing all of said deviation signal to vary at a relatively slow rate said characteristic of said system control signal, means at each said generating station for converting said system control signal to economic control signals representing change in generation of each said generator in said station corresponding to said change in incremental cost, and means for each said generator responsive both to said system control signal and to said economic control signal for varying the generation of said generator in accordance therewith.

10. An electric power control system for controlling the generation of a power system having at least one generating station and a plurality of generators, the system comprising means responsive to a difference between an actual condition of said system and a desired condition of said system for producing a deviation signal representing a change in incremental cost of generated power necessary to bring said actual condition to said desired condition, means for producing a system control signal, means for utilizing a predetermined proportion of said deviation signal to vary at a relatively fast rate a characteristic of said system control signal, means for utilizing all of said deviation signal to vary at a relatively slow rate said characteristic of said system control signal, means at each said generating station for converting said system control signal to economic control signals representing change in generation of each said generator in said station corresponding to said change in incremental cost, and means for each generator in said station for varying the generation of said generator at a relatively fast rate in response to said system control signal and at a relatively slow rate in response to said economic control signal.

11. An electric power control system for controlling the generation of a power system having at least one generating station and a plurality of generators comprising means for producing a deviation signal proportional to the difference between a condition of said system and a desired condition of said system, means for producing a control signal whose frequency varies in accordance with the amplitude and polarity of said deviation signal, means at at least one said generating station for modifying said control signal frequency for at least one said generator to cause generation with equal incremental costs for all said generators, and means for varying the outputs of said generators in response to the control signal for each said generator to tend to bring said system condition to said desired condition.

12. An electric power control system for controlling the generation of a power system having at least one generating station and a plurality of generators comprising means for producing a deviation signal proportional to the difference between a condition of said system and a desired condition of said system, means for producing a control signal whose frequency varies from the system frequency in accordance with the amplitude and polarity of said deviation signal, means at at least one said generating station for modifying said control signal frequency for at least one said generator to cause generation with equal incremental costs for all said generators, and means for varying the outputs of said generators in response to the difference between the control signal frequency for each said generator and said system frequency to tend to bring said system condition to said desired condition.

13. An electric power control system for controlling the generation of a power system having at least one generating station and a plurality of generators comprising means for producing a deviation signal proportional to the difference between a system condition and a desired condition, means for producing a control signal whose frequency varies from said system frequency in accordance with the amplitude and polarity of said deviation signal, means at at least one said generation station for varying said control signal frequency for at least one generator to cause generation with equal incremental costs for all said generators, means for comparing said control signal frequency and said system frequency to produce an output for each generator which is proportional to the difference therebetween, and means for varying the generation of each said generator in response to the output of the corresponding comparison means to tend to bring said system condition to said desired condition.

14. An electric power control system for controlling the generation of a power system having at least one generating station and a plurality of generators comprising means for producing a frequency deviation signal proportional to the difference between the system frequency and a standard frequency, means for producing a control signal whose frequency varies in accordance with the amplitude and polarity of said frequency deviation signal, means at at least one said generating station for varying said control signal frequency for at least one said generator to cause generation with equal incremental costs for all said generators, and means for varying the outputs of said generators in response to the control signal for each said generator to tend to maintain said system frequency at its standard value.

15. An electric power control system for controlling the generation of a power system having at least one generating station and a plurality of generators comprising means for producing a deviation signal proportional to the difference between a condition of said system and a desired condition of said system, means for producing a control signal which varies in accordance with the amplitude and polarity of said deviation signal, means at at least one said generating station for modifying said control signal for at least one said generator to cause generation with equal incremental costs for all said generators, said control signal modifying means being adapted to act more slowly than said control signal producing means, and means for varying the output of said generators in response to said control signal for each said generator to tend to bring said system condition to said desired condition.

16. An electric power control system for controlling the generation of a power system having at least one generating station and a plurality of generators comprising means for producing a deviation signal proportional to the difference between a condition of said system and a desired condition of said system, means for producing a control signal whose frequency varies in accordance with the amplitude and polarity of said deviation signal, means at at least one said generating station for modifying said control signal frequency for at least one said generator to cause generation with equal incremental costs for all said generators, and means for varying the output of said generators in response to the control signal for each said generator to tend to bring said system condition to said desired condition, said control signal producing means being adapted to correct quickly said system condition and said control signal modifying means being adapted to correct generation more slowly in accordance with equal incremental costs, thereby to lend stability to said control system.

17. An electric power control system for controlling the generation of a power system having at least one generating station and a plurality of generators comprising means for producing a deviation signal proportional to the difference between an actual power output and a desired power output in said system, means for producing a control signal whose frequency varies in accordance with the amplitude and polarity of said deviation signal, means at at least one said generating station for varying the frequency of said control signal for at least one said generator to cause generation with equal incremental costs for all said generators, and means for varying the outputs of said generators in response to the control signal for each said generator to tend to bring said power output to said desired power output.

18. An electric power control system for controlling the generation of a power system having at least one generating station and a plurality of generators comprising means for producing a frequency deviation signal proportional to the difference between the system frequency and a standard frequency, means for producing a control signal whose frequency varies from said system frequency in accordance with the amplitude and polarity of said frequency deviation signal, means at at least one said generating station for varying said control signal frequency for at least one said generator to cause generation with equal incremental costs for all said generators, means for comparing each said control signal frequency and said system frequency to produce an output for each generator which is proportional to the difference therebetween, and means for varying the generation of each corresponding generator in response to the output supplied to such means to tend to maintain said system frequency at its standard value.

19. An electric power control system for controlling the generation of a power system having at least one generating station and a p'urality of generators, the control system comprising means for producing a frequency deviation signal proportional to the difference between the system frequency and a standard frequency, means connected to receive said frequency deviation signal for producing a control signal whose frequency varies from said system frequency in accordance with the amplitude and polarity of said frequency deviation signal, means at said generating stations for producing a required output signal proportional to the output of each generator when all generators are operating at equal incremental costs, means for comparing said required output signal for each generator with a signal proportional to the actual output of said generator and producing an output difference signal which is proportional to the difference between said required output and said actual output signals, means responsive to said output difference signal for varying the frequency of said control signal for each generator in accordance therewith, means for comparing each said control signal frequency and said system frequency to produce an output for each generator which is proportional to the difference therebetween, and means connected to receive said output for varying the generation of each said generator in response to the output of the corresponding comparison means for maintaining said system frequency at its standard value.

20. An electric power control system for controlling the generation of a power system having a plurality of generating stations and a plurality of generators in each said generating station, the control system comprising means for producing a frequency deviation signal proportional to the difference between the system frequency and a standard frequency, means for producing a control signal for all generating stations whose frequency varies from said system frequency in accordance with the amplitude and polarity of said frequency deviation signal, means at each said generating station for comparing the frequency of said control signal with said system frequency to produce said frequency deviation signal, means for each generator in each said station for selecting a proportionate amount of said frequency deviation signal and producing a control signal for each said generator whose frequency varies from said system frequency in accordance with said selected proportionate amount of said frequency deviation signal, means for producing a required output signal proportional to the output of each said generator when all generators are operating at equal incremental costs, means for comparing said required output signal for each said generator with a signal proportional to the actual output of said generator and producing an output difference signal which is proportional to the difference between said required output and said actual output signals, means responsive to said output difference signal for varying the frequency of said control signal for each said generator in accordance therewith, means for each said generator for comparing the frequency of said control signal with said system frequency to produce an output proportional to the difference therebetween, and means connected to receive said output for varying the generation of each said generator in response to the output of the corresponding comparison means for maintaining said system frequency at its standard value.

21. An electric power control system for controlling the generation of a power system having a plurality of generating stations and a plurality of generators in each generating station, the control system comprising means for producing a frequency deviation signal proportional to the difference between the system frequency and a standard frequency, means for producing a control signal for all generating stations whose frequency varies from said system frequency in accordance with the amplitude and polarity of said frequency deviation signal, means at each said generating station for comparing the frequency of said control signal with said system frequency to produce a signal which is proportional to the difference therebetween, means for selecting a proportionate amount of said last-mentioned signal and producing a control signal for each generator in said station whose frequency varies from said system frequency in accordance with said selected proportionate amount of said last-mentioned signal, means at each said generating station for producing a required output signal proportional to the output of each said generator therein when all generators are operating at equal incremental costs, means for comparing said required output signal for each said generator with a signal proportional to the actual output of said generator and producing an output difference signal which is proportional to the difference between said required output and said actual output signals, means responsive to said output difference signal for varying the frequency of said control signal for each generator in accordance therewith, and means for varying the generation of each said generator in response to the corresponding generator control signal to maintain said system frequency at its standard value.

22. An electric power control system for controlling the generation of a power system having at least one generating station and a plurality of generators comprising means for producing a load deviation signal proportional to the difference between the actual load and a prescheduled load on tie line means interconnecting said power system, means for producing a control signal a characteristic of which varies in accordance with the amplitude and polarity of said load deviation signal, means at at least one said generating station for varying said characteristic of said control signal for at least one said generator to cause generation with equal incremental costs for all said generators, and means for varying the outputs of said generators in response to said varying characteristic of the control signal for each said generator to tend to maintain said tie line load at its prescheduled value.

23. An electric power control system for controlling the generation of a power system having at least one generating station and a plurality of generators comprising means for producing a load deviation signal proportional to the difference between the actual load and a prescheduled load on tie line means interconnecting said power system, means for producing a control signal whose frequency varies in accordance with the amplitude and polarity of said load deviation signal, means at at least one said generating station for varying the frequency of said control signal for at least one said generator to cause generation with equal incremental costs for all said generators, and means for varying the outputs of said generators in response to the control signal for each said generator to tend to maintain said tie line load at its prescheduled value.

24. An electric power control system for controlling the generation of a power system having at least one generating station and a plurality of generators comprising means for producing a load deviation signal proportional to the difference between the actual load and a prescheduled load on tie line means interconnecting said power system, means connected to receive said load deviation signal for producing a control signal whose frequency varies from said system frequency in accordance with amplitude and polarity of said load deviation signal, means at at least one said generating station connected to receive said control signal for varying the frequency of said control signal for at least one said generator to cause generation with equal incremental costs for all generators, means connected to receive said control signal for comparing said control signal frequency and said system frequency to produce an output for each said generator which is proportional to the difference therebetween, and means for varying the generation of each corresponding generator in response to the output supplied to such means to tend to maintain said tie line load at its prescheduled value.

25. An electric power control system for controlling the generation of a power system having at least one generating station and a plurality of generators, the control system comprising means for producing a load deviation signal proportional to the difference between the actual load and a prescheduled load on tie line means interconnecting said power system, means connected to receive said load deviation signal for producing a control signal whose frequency varies from said system frequency in accordance with the amplitude and polarity of said load deviation signal, means at said generating station for producing a required output signal proportional to the output of each generator when all generators are operating at equal incremental costs, means for comparing said required output signal for each generator with a signal proportional to the actual output of said generator and producing an output difference signal which is proportional to the difference between said required output and said actual output signals, means responsive to said output difference signal for varying the frequency of said control signal for each generator in accordance therewith, means for comparing each said control signal frequency and said system frequency to produce an output for each generator which is proportional to the difference therebetween, and means connected to receive said output for varying the generation of each said generator in response to the output of the corresponding comparison means for maintaining said tie line load at its prescheduled value.

26. An electric power control system for controlling the generation of a power system having a plurality of generating stations and a plurality of generators in each said generating station, the control system comprising means for producing a load deviation signal proportional to the difference between the actual load and a prescheduled load on tie line means interconnecting said power system, means for producing a control signal for all generating stations whose frequency varies from said system frequency in accordance with the amplitude and polarity of said load deviation signal, means at each said generating station for comparing the frequency of said control signal with said system frequency to produce said load deviation signal, means for each generator in each said station for selecting a proportionate amount of said load deviation signal and producing a control signal for each generator whose frequency varies from said system frequency in accordance with said selected proportionate amount of said load deviation signal, means at each said station for producing a required output signal proportional to the output of each generator therein when all generators are operating at equal incremental costs, means for comparing said requiring output signal for each generator with a signal proportional to the actual output of said generator and producing an output difference signal which is proportional to the difference between said required output and said actual output signals, means responsive to said output difference signal for varying the frequency of said control signal for each generator in accordance therewith, means for each said generator for comparing the frequency of said control signal with said system frequency to produce an output proportional to the difference therebetween, and means connected to receive said output for varying the generation of each said generator in response to the output of the corresponding comparison means for maintaining said tie line load at its prescheduled value.

27. An electric power control system for controlling the generation of a power system having a plurality of generating stations and a plurality of generators in each generating station, the control system comprising means for producing a load deviation signal proportional to the difference between the actual load and a prescheduled load on tie line means interconnecting said power system, means for producing a control signal for all generating stations whose frequency varies from said system frequency in accordance with the amplitude and polarity of said load deviation signal, means at each generating station for comparing the frequency of said control signal with said system frequency to produce a signal which is proportional to the difference therebetween, means for selecting a proportionate amount of said last-mentioned signal and producing a control signal for each generator in said station whose frequency varies from said system frequency in accordance with said selected proportionate amount of said last-mentioned signal, means in said stations for producing a required output signal proportional to the output of each said generator when all generators are operating at equal incremental costs, means for comparing said required output signal for each said generator with a signal proportional to the actual output of said generator and pro- ducing an output difference signal which is proportional to the difference between said required output and said actual output signals, means responsive to said output difference signal for varying the frequency of said control signal for each generator in accordance therewith, and means for varying the generation of each said generator in response to the corresponding generator control signal to maintain said tie line load at its prescheduled value.

28. An electric power control system for controlling the generation of a power system having at least one generating station and a plurality of generators comprising means for producing a load deviation signal proportional to the difference between the actual load and a prescheduled load on tie line means interconnecting said power system, means for combining said load deviation signal with a frequency deviation signal which is proportional to the difference between the system frequency and a standard frequency and producing a control signal a characteristic of which varies with the amplitude and polarity of the combined deviation signals, means at at least one said generating station for varying said characteristic of said control signal for at least one said generator to cause generation with equal incremental costs for all said generators, and means for varying the generation of each said generator in response to said varying characteristic of the control signal supplied to such means to maintain said system frequency at its standard value and said tie line load at its prescheduled value.

29. An electric power control system for controlling the generation of a power system having at least one generating station and a plurality of generators comprising means for producing a load deviation signal proportional to the difference between the actual load and a prescheduled load on tie line means interconnecting said power system, means for combining said load deviation signal with a frequency deviation signal which is proportional to the difference between the system frequency and a standard frequency and producing a control signal whose frequency varies with the amplitude and polarity of the combined deviation signals, means at at least one said generating station for varying the frequency of said control signal for at least one said generator to cause generation with equal incremental costs for all said generators, and means for varying the generation of each said generator in response to the frequency of the control signal supplied to such means to maintain said system frequency at its standard value and said tie line load at its prescheduled value.

30. An electric power control system for controlling the generation of a power system having at least one generating station and a plurality of generators, the control system comprising means for producing a load deviation signal proportional to the difference between the actual load and a prescheduled load on tie line means interconnecting said power system, means for combining said load deviation signal with a frequency deviation signal which is proportional to the difference between the system frequency and a standard frequency to produce a control signal whose frequency varies from said system frequency in accordance with the amplitude and polarity of said combined deviation signals, means at said generating stations for producing a required output signal proportional to the output of each generator when all generators are operating at equal incremental costs, means for comparing said required output signal for each generator with a signal proportional to the actual output of said generator and producing an output difference signal which is proportional to the difference between said required output and said actual output signals, means responsive to said output difference signal for varying the frequency of said control signal for each generator in accordance therewith, means for comparing each said control signal frequency and said system frequency to produce an output for each generator which is proportional to the difference therebetween, and means connected to receive said output for varying the generation of each said generator in response to the output of the corresponding comparison means for maintaining said system frequency at its standard value and said tie line load at its prescheduled value.

31. An electric power control system for controlling the generation of a power system having a plurality of generating stations and a plurality of generators in each said generating station, the control system comprising means for producing a load deviation signal proportional to the difference between the actual load and prescheduled load on tie line means interconnecting said power system, means for combining said load deviation signal with a frequency deviation signal which is proportional to the difference between the system frequency and a standard frequency to produce a control signal for all generating stations whose frequency varies from said system frequency in accordance with the amplitude and polarity of said combined deviation signals, means at each said generating station for comparing the frequency of said control signal with said system frequency to produce said combined deviation signals, means for each generator in each said station for selecting a proportionate amount of said combined deviation signals and producing a control signal for each generator whose frequency varies from said system frequency in accordance with said selected proportionate amount of said combined deviation signals, means at each said generating station for producing a required output signal proportional to the output of each generator therein when all generators are operating at equal incremental costs, means for comparing said required output signal for each generator with a signal proportional to the actual output of said generator and producing an output difference signal which is proportional to the difference between said required output and said actual output signals, means responsive to said output difference signal for varying the frequency of said control signal for each generator in accordance therewith, means for each said generator for comparing the frequency of said control signal with said system frequency to produce an output proportional to the difference therebetween, and means connected to receive said output for varying the generation of each said generator in response to the output of the corresponding comparison means for maintaining said system frequency at its standard value and said tie line load at its prescheduled value.

32. An electric power control system for controlling the generation of a power system having a plurality of generating stations and a plurality of generators in each generating station, the control system comprising means for producing a load deviation signal proportional to the difference between the actual load and a prescheduled load on tie line means interconnecting said power system, means for combining said load deviation signal with a frequency deviation signal which is proportional to the difference between the system frequency and a standard frequency, means for producing a control signal for all generating stations whose frequency varies from said system frequency in accordance with the amplitude and polarity of said combined deviation signals, means at each generating station for comparing the frequency of said control signal with said system frequency to produce a signal which is proportional to the difference therebetween, means for selecting a proportionate amount of said last-mentioned signal and producing a control signal for each generator in said station whose frequency varies from said system frequency in accordance with said selected proportionate amount of said last-mentioned signal, means at said generating stations for producing a required output signal proportional to the output of each generator when all generators are operating at equal incremental costs, means for comparing said required output signal for each generator with a signal proportional to the actual output of said generator and producing an output difference signal which is proportional to the difference between said required output and said actual output signals, means responsive to said output difference signal for varying the frequency of said control signal for each generator in accordance therewith, and means for varying the generation of each said generator in response to the corresponding generator control signal to maintain said system frequency at its standard value and said tie line load at its prescheduled value.

33. An electric power control system for controlling the generation of a power system comprising means for producing a load deviation signal proportional to the difference between the actual load and a prescheduled load on tie line means interconnecting said power system, means for producing a signal whose frequency varies from the system frequency in accordance with the amplitude and polarity of said load deviation signal, means for subtracting a standard frequency from the frequency of said signal to produce a combined deviation signal which is proportional to the algebraic sum of the deviation of said system frequency from said standard frequency and said load deviation, means for producing a control signal whose frequency varies from said system frequency in accordance with the amplitude and polarity of said combined deviation signal, and means for varying the generation of said power system in response to said control signal to maintain said system frequency at its standard value and said tie line load at its prescheduled value.

References Cited in the file of this patent

UNITED STATES PATENTS

| Number | Name | Date |
|---|---|---|
| Re. 20,548 | Doyle | Nov. 9, 1937 |
| 1,984,187 | Hayward et al. | Dec. 11, 1934 |
| 2,050,338 | Kerr | Aug. 11, 1936 |
| 2,054,411 | Doyle | Sept. 15, 1936 |
| 2,124,725 | Williams et al. | July 26, 1938 |
| 2,366,968 | Kaufmann | Jan. 9, 1945 |
| 2,504,768 | Watson et al. | Apr. 18, 1950 |
| 2,624,015 | Herwald et al. | Dec. 30, 1952 |
| 2,692,342 | Nichols et al. | Oct. 19, 1954 |
| 2,694,780 | Pattison | Nov. 16, 1954 |
| 2,701,329 | Lynch et al. | Feb. 1, 1955 |
| 2,710,355 | Chilman et al. | June 7, 1955 |
| 2,743,097 | Carolus et al. | Apr. 24, 1956 |
| 2,749,450 | Wellington | June 5, 1956 |
| 2,753,505 | Larew et al. | July 3, 1956 |
| 2,754,429 | Phillips | July 10, 1956 |
| 2,773,994 | Cohn | Dec. 11, 1956 |
| 2,824,240 | Lynch et al. | Feb. 18, 1958 |

OTHER REFERENCES

"Evaluation of Methods of Coordinating Incremental Fuel Costs and Incremental Transmission Losses," by L. K. Kirchmayer and G. W. Stagg, AIEE Transactions, vol. 71, 1952.

"Transmission Losses and Economic Loading of Power Systems," by L. K. Kirchmayer and H. S. McDaniels, published in General Electric Review, October 1951.

"Electronic Analog Computers," by Korn and Korn, McGraw-Hill Book Co., Inc., New York, N.Y., 1952.